US009085354B1

(12) United States Patent
Peeters et al.

(10) Patent No.: US 9,085,354 B1
(45) Date of Patent: Jul. 21, 2015

(54) SYSTEMS AND METHODS FOR VERTICAL TAKEOFF AND/OR LANDING

(71) Applicant: Google Inc., Mountain View, CA (US)

(72) Inventors: Eric Peeters, Mountain View, CA (US); William Graham Patrick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/868,539

(22) Filed: Apr. 23, 2013

(51) Int. Cl.
*B64C 27/26* (2006.01)
*B64C 29/00* (2006.01)

(52) U.S. Cl.
CPC ..................................... *B64C 29/00* (2013.01)

(58) Field of Classification Search
USPC ...................... 244/6, 7 R, 7 B, 7 C, 7 A, 12.4
See application file for complete search history.

(56) References Cited

U.S. PATENT DOCUMENTS

| | | | |
|---|---|---|---|
| 2,479,125 | A | 8/1949 | Leonard |
| 2,866,608 | A | 12/1958 | Leonard |
| 3,528,630 | A | 9/1970 | Ferris et al. |
| 5,145,129 | A | 9/1992 | Gebhard |
| 5,516,060 | A | 5/1996 | McDonnell |
| 5,934,873 | A * | 8/1999 | Greene ........................... 416/22 |
| 5,954,169 | A * | 9/1999 | Jensen ........................... 188/378 |
| 5,971,322 | A | 10/1999 | Beretta et al. |
| 6,065,933 | A | 5/2000 | Secord |
| 7,801,522 | B2 | 9/2010 | Knoblach et al. |
| 8,157,203 | B2 | 4/2012 | Kinsey et al. |
| 8,376,264 | B1 | 2/2013 | Hong et al. |
| 8,434,710 | B2 | 5/2013 | Hothi et al. |
| 2010/0072325 | A1 | 3/2010 | Sambell |
| 2010/0230547 | A1 | 9/2010 | Tayman |
| 2011/0042509 | A1 | 2/2011 | Bevirt et al. |
| 2012/0248259 | A1 | 10/2012 | Page et al. |
| 2012/0286102 | A1 | 11/2012 | Sinha et al. |
| 2012/0292456 | A1 | 11/2012 | Hollimon et al. |
| 2013/0206921 | A1 | 8/2013 | Paduano et al. |

OTHER PUBLICATIONS

Casau, "Autonomous Transition Flight for a Vertical Take-Off and Landing Aircraft", https://dspace.ist.utl.pt/bitstream/2295/718514/1/tese.pdf, Sep. 2010.
Frank, Adrian, et al., Hover, Transition, and Level Flight Control Design for a Single-Propeller Indoor Airplane, American Institute of Aeronautics and Astronautics, pp. 1-18, http://acl.mit.edu/papers/GNC_airplane_Aug_2007_v0.pdf.
Bell Boeing V-22 Osprey, Wikipedia, [Retrieved on Apr. 1, 2015] from Internet: http://en.wikipedia.org/wiki/Bell_Boeing_V-22_Osprey.
Harrier Jump Jet, Wikipedia, [Retrieved on Apr. 1, 2015] from Internet: http://en.wikipedia.org/wiki/Harrier_Jump_Jet.

* cited by examiner

*Primary Examiner* — J. Woodrow Eldred
(74) *Attorney, Agent, or Firm* — McDonnell Boehnen Hulbert & Berghoff LLP

(57) ABSTRACT

Systems and methods for vertical takeoff and/or landing are disclosed herein. An aerial vehicle may include a first propulsion unit and a second propulsion each rotatably connected to a body. The aerial vehicle may include a first wing and a second wing each rotatably connected to the body. And the aerial vehicle may include a control system configured to: position the first propulsion unit, the second propulsion unit, the first wing, and the second wing; operate the first propulsion unit and the second propulsion unit; and rotate the first propulsion unit, the second propulsion unit, the first wing, and the second wing.

20 Claims, 14 Drawing Sheets

SYSTEMS AND METHODS FOR VERTICAL TAKEOFF AND/OR LANDING

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Systems and methods for vertical takeoff and/or landing are disclosed herein. It may be beneficial for an aerial vehicle, such as an unmanned aerial vehicle (UAV), to vertically takeoff and/or land for a variety of reasons, such as taking off and/or landing at locations without a runway of an airport. To perform a vertical takeoff and/or landing, a UAV typically needs more control of its propulsion systems, particularly during a descent rate, since a UAV usually immediately comes to a stop when it lands vertically, rather than using brakes to slow down as it travels down a runway. Beneficially, the disclosed systems and methods can improve safety and/or versatility of an aerial vehicle without sacrificing other performance aspects of the aerial vehicle.

In one aspect, an aerial vehicle may include a first propulsion unit and a second propulsion unit each rotatably connected to a body, wherein the first propulsion unit is located on a first side of the body, and wherein the second propulsion unit is located on a second side of the body; a first wing and a second wing each rotatably connected to the body, wherein the first wing is located on the first side of the body, and wherein the second wing is located on the second side of the body; and a control system configured to: position the first propulsion unit, the second propulsion unit, the first wing, and the second wing, such that when the aerial vehicle is substantially perpendicular to the ground, the first propulsion unit is oriented substantially opposite to the second propulsion unit and the first wing is oriented substantially opposite to the second wing; operate the first propulsion unit and the second propulsion unit to cause the aerial vehicle to spin around a centerline of the aerial vehicle and thereby vertically lift off the ground; and rotate the first propulsion unit, the second propulsion unit, the first wing, and the second wing, such that a vertical component of a thrust of the first propulsion unit and the second propulsion unit increases during the rotation, wherein after rotating for a certain period of time, the first propulsion unit is oriented substantially parallel to the second propulsion unit, the first wing is oriented substantially parallel to the second wing and the aerial vehicle is not spinning around the centerline.

In another aspect, a method may involve positioning a first propulsion unit, a second propulsion unit, a first wing, and a second wing each rotatably connected to a body of an aerial vehicle, such that when the aerial vehicle is substantially perpendicular to the ground, the first propulsion unit is oriented substantially opposite to the second propulsion unit and the first wing is oriented substantially opposite to the second wing; operating the first propulsion unit and the second propulsion unit to cause the aerial vehicle to spin around a centerline of the aerial vehicle and thereby vertically lift off the ground; rotating the first propulsion unit, the second propulsion unit, the first wing, and the second wing, such that a vertical component of a thrust of the first propulsion unit and the second propulsion unit increases during the rotation, wherein after rotating for a certain period of time, the first propulsion unit is oriented substantially parallel to the second propulsion unit, the first wing is oriented substantially parallel to the second wing, and the aerial vehicle enters vertical flight; and transitioning the aerial vehicle from vertical flight to horizontal flight.

In another aspect, a method may involve transitioning an aerial vehicle from horizontal flight to vertical flight; and rotating a first propulsion unit, a second propulsion unit, a first wing, and a second wing each rotatably connected to a body of the aerial vehicle, such that a horizontal component of a thrust of the first propulsion unit and the second propulsion unit increases during the rotation, wherein after rotating for a certain period of time, the first propulsion unit is oriented substantially opposite to the second propulsion unit and the first wing is oriented substantially opposite to the second wing and the aerial vehicle is spinning around a centerline of the aerial vehicle.

In another aspect, a system may include means for positioning a first propulsion unit, a second propulsion unit, a first wing, and a second wing each rotatably connected to a body of an aerial vehicle, such that when the aerial vehicle is substantially perpendicular to the ground, the first propulsion unit is oriented substantially opposite to the second propulsion unit and the first wing is oriented substantially opposite to the second wing; means for operating the first propulsion unit and the second propulsion unit to cause the aerial vehicle to spin around a centerline of the aerial vehicle and thereby vertically lift off the ground; means for rotating the first propulsion unit, the second propulsion unit, the first wing, and the second wing, such that a vertical component of a thrust of the first propulsion unit and the second propulsion increases during the rotation, wherein after rotating for a certain period of time, the first propulsion unit is oriented substantially parallel to the second propulsion unit, the first wing is oriented substantially parallel to the second wing, and the aerial vehicle enters vertical flight; and means for transitioning the aerial vehicle from vertical flight to horizontal flight.

In yet another aspect, a system may include means for transitioning an aerial vehicle from horizontal flight to vertical flight; and means for rotating a first propulsion unit, a second propulsion unit, a first wing, and a second wing each rotatably connected to a body of the aerial vehicle, such that a horizontal component of a thrust of the first propulsion unit and the second propulsion unit increases during the rotation, wherein after rotating for a certain period of time, the first propulsion unit is oriented substantially opposite to the second propulsion unit and the first wing is oriented substantially opposite to the second wing and the aerial vehicle is spinning around a centerline of the aerial vehicle.

These as well as other aspects, advantages, and alternatives, will become apparent to those of ordinary skill in the art by reading the following detailed description, with reference where appropriate to the accompanying drawings.

DETAILED DESCRIPTION

Figure 1:
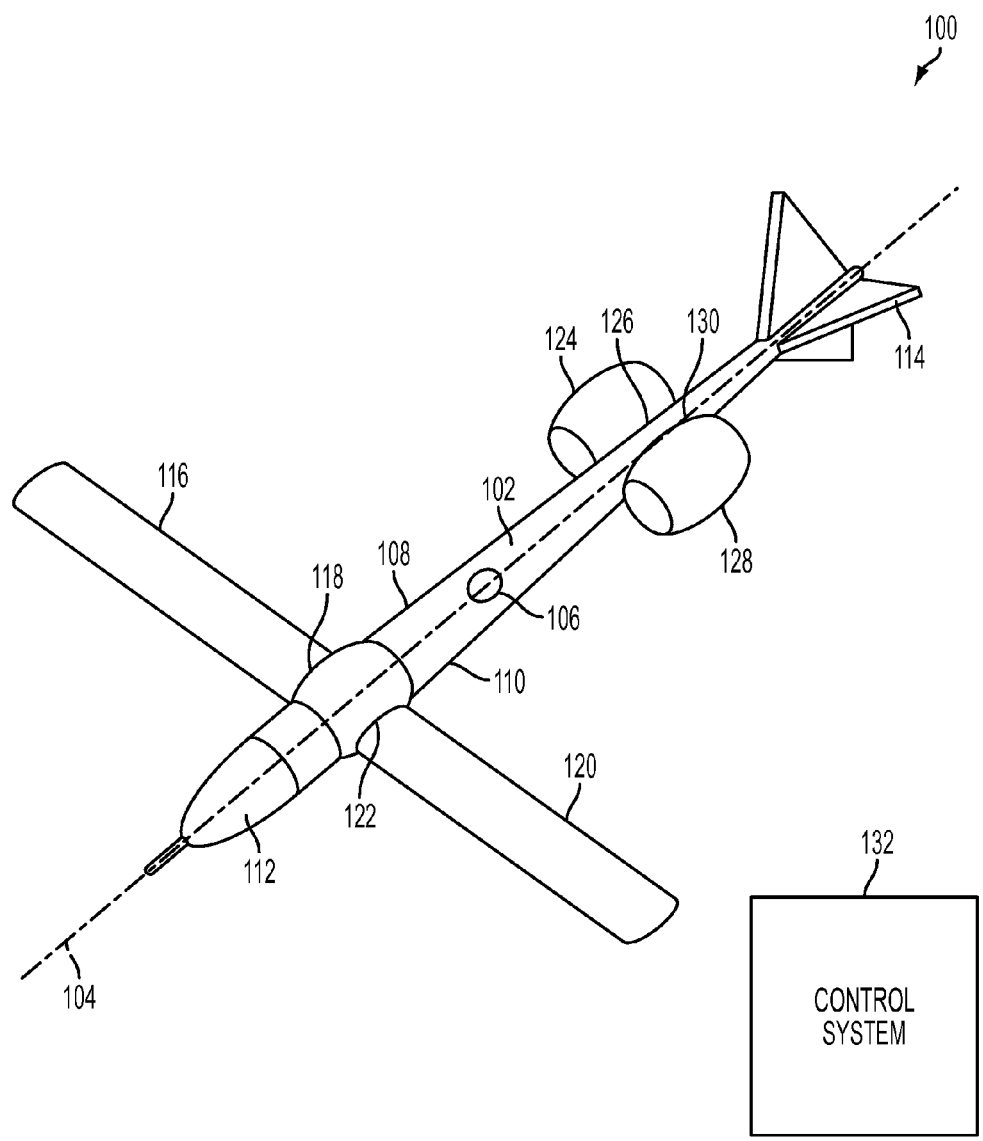
FIG. 1 depicts an aerial vehicle, according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. Overview

Embodiments described herein may be implemented in or take the form of an aerial vehicle; for example, a UAV. In particular, an aerial vehicle is disclosed in which propulsion units and wings may be rotated by a control system, such that the aerial vehicle can vertically takeoff and/or land. (Such an aerial vehicle may be commonly referred to as a "tail-sitter.")

For example, while the aerial vehicle is vertically oriented, the propulsion system may be oriented to produce horizontal thrust, which causes the wings (and possibly the entire vehicle) to spin, act as rotor blades and provide lift for takeoff or descent. By rotating the propulsion pods so that a horizontal component of thrust increases or decreases (and conversely, so that a vertical component of thrust decreases or increases), the aerial vehicle may control the rate at which the wings (and possibly the entire vehicle) spin and thus the rate of ascent or descent. Further, once takeoff is complete the wings and propulsion units may be rotated so that the aerial vehicle is configured to fly similarly to a typical fixed-wing airplane.

In an illustrative embodiment, an aerial vehicle may include a first propulsion unit and a second propulsion unit each rotatably connected to a body. The first propulsion unit could be located on a first side of the body and could be configured to provide thrust when operated. The second propulsion unit could be located on a second side of the body and could be configured to provide thrust when operated. The aerial vehicle may include a first wing and a second wing each rotatably connected to the body. The first wing could be located on the first side of the body and the second wind could be located on the second side of the body. In an illustrative implementation, the first propulsion unit may be attached to the first wing and the second propulsion unit may be attached to the second wing.

The aerial vehicle may include a control system configured to rotate the first propulsion unit, the second propulsion unit, the first wing, and the second wing, such that the aerial vehicle can vertically takeoff and/or land.

For a vertical takeoff when the aerial vehicle is substantially perpendicular to a ground, the control system may be configured to position the first propulsion unit, the second propulsion unit, the first wing, and the second wing, such that the first propulsion unit is oriented substantially opposite to the second propulsion unit and the first wing is oriented substantially opposite to the second wing. The control system may be configured to operate the first propulsion unit and the second propulsion unit, which may cause the aerial vehicle to spin around a centerline of the aerial vehicle and thereby vertically lift off the ground. And the control system may be configured to rotate the first propulsion unit, the second propulsion unit, the first wing, and the second wing, such that the aerial vehicle enters vertical flight. After rotating for a certain period of time, and achieving some vertical speed, the first propulsion unit is gradually oriented substantially parallel to the second propulsion unit, the first wing is gradually oriented substantially parallel to the second wing, and the aerial vehicle is not spinning around the centerline when the first propulsion unit is oriented fully parallel with the second propulsion unit and the first wing is fully parallel with the second wing. At this time, the vehicle is a fixed-wing aircraft in vertical flight; and can transition from vertical flight to horizontal flight by performing a roll or other known fixed wing maneuver. The gradual orientation change of the propulsion units is done in coordination with the gradual orientation changes of the wings, with the vertical speed of the vehicle and with the rotation rate of the vehicle around its centerline. In an illustrative implementation, a rate of rotation of the first propulsion unit and the second propulsion unit may be correlated to (or be equal to) a rate of rotation of the first wing and the second wing.

For a vertical landing when the aerial vehicle is in vertical flight, the control system may be configured to rotate the first propulsion unit, the second propulsion unit, the first wing, and the second wing, such that the aerial vehicle spins around the centerline and hovers and/or achieves a soft touch down. After rotating for a certain period of time, the first propulsion unit is oriented substantially opposite to the second propulsion unit and the first wing is oriented substantially opposite to the second wing. The aerial vehicle may transition from horizontal flight to vertical flight, such as vertical ascent or descent, via a flight maneuver.

It should be understood that the above embodiments, and other embodiments described herein, are provided for explanatory purposes, and are not intended to be limiting.

II. Illustrative Systems

A. Aerial Vehicle

FIG. 1 depicts an aerial vehicle 100, according to an example embodiment. In particular, the aerial vehicle 100 includes a body 102, a centerline 104, a center of mass 106, a first side 108 of the body 102, a second side 110 of the body 102, a front section 112, and a rear section 114. The body 102 may be a fuselage, as but one example, though other bodies and/or other types of bodies are possible as well. As shown in FIG. 1, the centerline 104 is located in between the first side 108 of the body 102 and the second side 110 of the body 102. And as shown in FIG. 1, the center of mass 106 is located on the centerline 104. With this arrangement, a vibration of the aerial vehicle 100 might be minimized and/or avoided during vertical takeoff and/or landing described herein.

The center of mass 106 may represent a mass of component(s) of the aerial vehicle, such as a payload, a fuel, one or more batteries, etc. The front section 112 may include one or more components (e.g., a nose) to minimize aerodynamic forces on the aerial vehicle 100 during horizontal and/or vertical flight, such as drag. The rear section 114 may include one or more components (e.g., tail fins, elevators, rudders) to assist in stabilizing the aerial vehicle 100 during horizontal and/or vertical flight and/or one or more components (e.g., pads, wheels) to assist in vertical takeoff and/or landing described herein.

The aerial vehicle 100 also includes a first wing 116 and a second wing 120. The first wing 116 and the second wing 120 may provide a lift to the aerial vehicle 100. The first wing 116 is rotatably connected to the first side 108 of the body 102 via a first rotatable connection 118, and the second wing 120 is rotatably connected to the second side 110 of the body 102 via a second rotatable connection 122.

The first wing 116 and the second wing 120 could take various different forms in various different embodiments. In some embodiments, the first wing 116 and the second wing 116 may each be an airfoil. And other wings and/or types of wings are possible as well.

The aerial vehicle 100 also includes a first propulsion unit 124 and a second propulsion unit 128. The first propulsion unit 124 and the second propulsion unit 128 may provide a thrust to the aerial vehicle 100. The first propulsion unit 124 is rotatably connected to the first side 108 of the body 102 via a third rotatable connection 126 and the second propulsion unit 128 is rotatably connected to the second side 110 of the body 102 via a fourth rotatable connection 130.

The first propulsion unit 124 and the second propulsion unit 128 could take various different forms in various different embodiments. In some embodiments, the first propulsion unit 124 and the second propulsion unit 128 may each be a propulsion pod, a jet, and/or a propeller. In some embodiments, the first propulsion unit 124 and the second propulsion unit 128 may each be in a push-type or pull-type configuration. And other propulsion units and/or types of propulsion units are possible as well.

In some embodiments, the first propulsion unit 124 and the second propulsion unit 128 may be powered by a fuel, such as a hydrocarbon-based fuel. And in at least one such embodiment, the fuel may be stored in the body 102 and delivered to the first propulsion unit 124 and the second propulsion unit 128 via one or more fluid conduits, such as piping. In other embodiments, the first propulsion unit 124 and the second propulsion unit 128 may be powered by one or more batteries. And in at least on such embodiment, the one or more batteries may be located on the body 102 and connected to the first propulsion unit 124 and the second propulsion unit 128 via one or more electrical connections, such as one or more wires and/or wireless interfaces.

In some embodiments, the first propulsion unit 124 may be attached to the first wing 116 and the second propulsion unit 128 may be attached to the second wing 120.

The first rotatable connection 118 may be any suitable arrangement of component(s) to rotate the first wing 116, the second rotatable connection 122 may be any suitable arrangement of component(s) to rotate the second wing 120, the third rotatable connection 126 may be any suitable arrangement of component(s) to rotate the first propulsion unit 124, and the fourth rotatable connection may be any suitable arrangement of component(s) to rotate the second propulsion unit 128. In some embodiments, the first rotatable connection 118, the second rotatable connection 122, the third rotatable connection 126, and/or the fourth rotatable connection 130 may take the form of or be similar in form to any one of the first rotatable connection 118, the second rotatable connection 122, the third rotatable connection 126, and the fourth rotatable connection 130.

In a further aspect, the aerial vehicle 100 includes a control system 132. The control system 132 is configured to control operation(s) of the aerial vehicle 100 and its components. In some embodiments, the control system 132 may be configured to perform one or more functions described herein.

The control system 132 may be implemented with mechanical systems and/or with hardware, firmware, and/or software. As one example, the control system 132 may take the form of program instructions stored on a non-transitory computer readable medium and a processor that executes the instructions. The control system 132 may be implemented in whole or in part on the aerial vehicle 100 and/or at least one entity remotely located from the aerial vehicle 100, such as a ground-station (not shown). Generally, the manner in which the control system 132 is implemented may vary, depending upon the particular application.

In some embodiments, the aerial vehicle 100 may be a UAV. The term "unmanned aerial vehicle," as used in this disclosure, refers to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

In some embodiments, the aerial vehicle 100 may be operated by a pilot, such as a physically-present human pilot. And in at least one such embodiment, the aerial vehicle 100 could transport one or more passengers.

B. Vertical Takeoff

Figure 2:
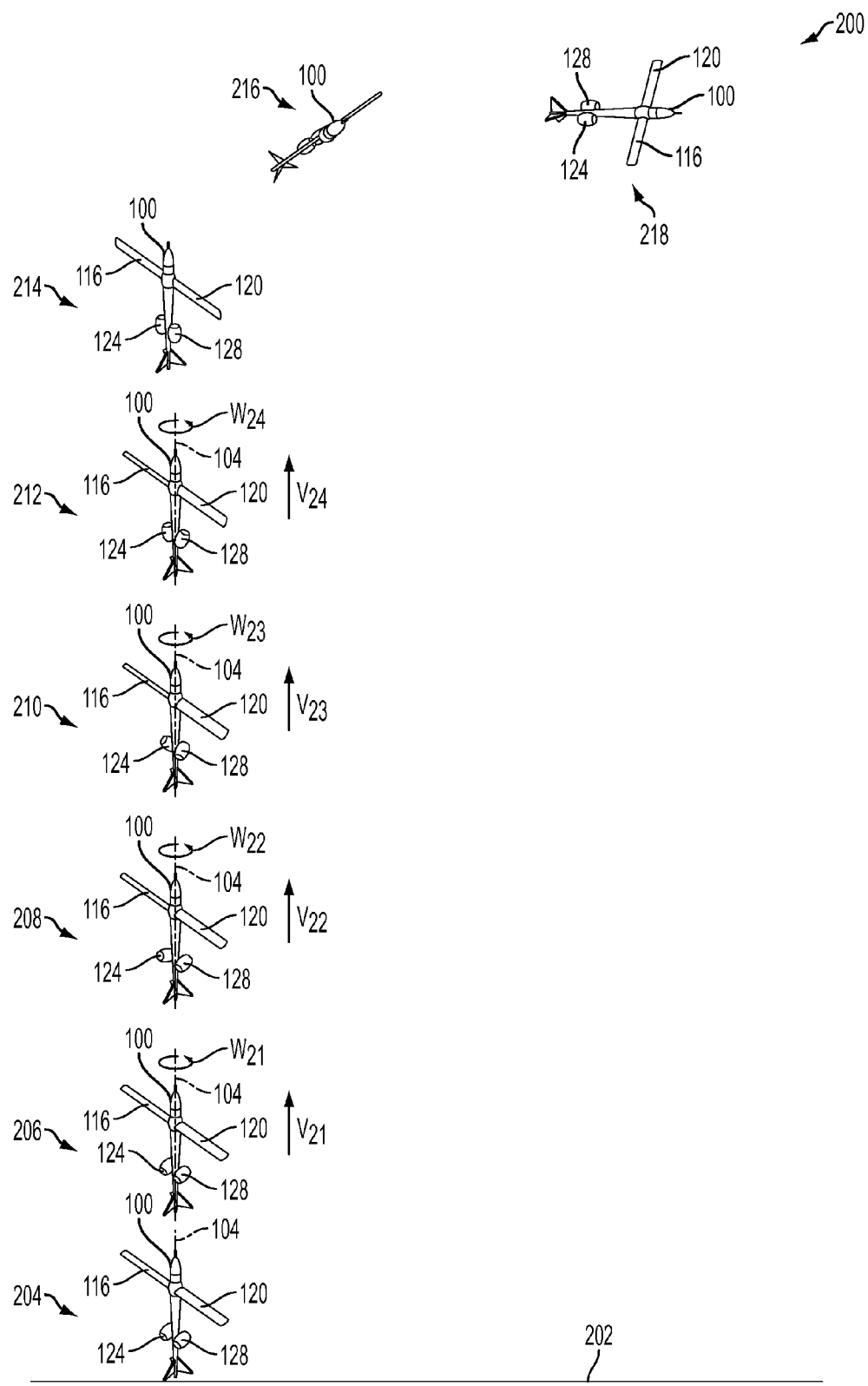
FIG. 2 depicts an example of an aerial vehicle vertically taking off, according to an example embodiment.

FIG. 2 depicts an example 200 of an aerial vehicle vertically taking off, according to an example embodiment. Example 200 is generally described by way of example as being carried out by the aerial vehicle 100 described above in connection with FIG. 1. For illustrative purposes, example 200 is described in a series steps as shown in FIG. 2, though example 200 could be carried in any number of steps and/or combination of steps.

Example 200 begins at step 204 with the aerial vehicle 100 being located on a ground 202. The aerial vehicle 100 may be configured to takeoff from a ground 202 that varies in form. For example, the aerial vehicle 100 may be configured to takeoff from terrain that is substantially flat. However, the aerial vehicle 100 may additionally or alternatively be configured to takeoff from terrain that is sloped, hilly, and/or mountainous, among other possibilities. Further, the aerial vehicle 100 may be configured to takeoff and/or land in various types of environments, such as an urban or rural environment.

As shown in FIG. 2, at step 204 the aerial vehicle 100 is oriented substantially perpendicular to the ground 202. The term "substantially perpendicular," as used in this disclosure, refers to exactly perpendicular and/or one or more deviations from exactly perpendicular that do not significantly impact vertical takeoff and/or landing as described herein. More specifically, at step 204 the aerial vehicle 100 (i) positions the first propulsion unit 124, the second propulsion unit 128, the first wing 116, and the second wing 120, such that the first propulsion unit 124 is opposite to the second propulsion unit 128 and the first wing 116 is opposite to the second wing 120 and (ii) operates the first propulsion unit 124 and the second propulsion unit 128 to provide a thrust to the aerial vehicle 100. The thrust of the first propulsion unit 124 and the second propulsion unit 128 causes the aerial vehicle to spin around the centerline 104 with a rotational speed W21 and thereby lift off the ground 202 with linear speed V21, as shown in step 206.

In some embodiments, the positioning of the first propulsion unit 124, the second propulsion unit 128, the first wing 116, and the second wing 120 may be performed by the control system 132. Moreover, in some embodiments, the operating of the first propulsion unit 124 and the second propulsion unit 128 to provide a thrust to the aerial vehicle 100 may be performed by the control system 132.

At step 204 and step 206 the first propulsion unit 124 is positioned at an angle θ211 to the body 102, the second propulsion unit 128 is positioned at an angle θ221 to the body 102, the first wing 116 is positioned at an angle θ231 to the body 102, and the second wing 120 is positioned at an angle θ241 to the body 102 (angles not labeled in FIG. 2).

The angle θ211, the angle θ221, the angle θ231, and the angle θ241 could take various different forms in various different embodiments. In some embodiments, the angle θ211 and the angle θ221 may be substantially opposite. The term "substantially opposite," as used in this disclosure, refers to exactly opposite and/or one or more deviations from exactly opposite that do not significantly impact vertical take-off and/or landing as described herein. And in at least one such embodiment, the angle θ211 and the angle θ221 can each be substantially ninety degrees from the respective angles of the first propulsion unit 124 and the second propulsion unit 128 to the body 102 during horizontal flight and/or vertical flight. The term "substantially ninety degrees," as used in this disclosure, refers to exactly ninety degrees and/or one or more deviations from exactly ninety degrees that do not significantly impact vertical takeoff and/or landing as described herein. And other arrangements and/or types of arrangement for the angle θ211 and the angle θ221 are possible as well.

In some embodiments, the angle θ231 and the angle θ241 can be substantially opposite. And in at least one such embodiment, the angle θ231 and the angle θ241 can each be substantially ninety degrees from the respective angles of the first wing 116 and the second wing 120 to the body 102 during horizontal flight and/or vertical flight. And other arrangements and/or types of arrangements for the angle θ231 and the angle θ241 are possible as well.

Example 200 continues at step 208 to step 212 with the aerial vehicle 100 rotating first propulsion pod 124, the second propulsion pod 128, the first wing 116, and the second wing 120, such that a vertical component of thrust of the first propulsion unit 124 and the second propulsion unit 128 increases during the rotation. In some embodiments, the vertical component of thrust of the first propulsion unit 124 and the second propulsion unit 128 can increase at least part of a time period during the rotation. Moreover, in other embodiments, the vertical component of thrust of the first propulsion unit 124 and the second propulsion unit 128 can continuously increase during the rotation. Furthermore, in some embodiments, the rotating of the first propulsion unit 124, the second propulsion unit 128, the first wing 116, and the second wing 120 can be performed by the control system 132. And in some embodiments, the first wing 116 and the second wing 120 at step 204, step 206, step 208, step 210, and/or step 212 may be referred to as being in "rotor mode."

In some embodiments, the first propulsion unit 124 and the second propulsion unit 128 may be rotated at a first variable rate of rotation and the first wing 116 and the second wing 120 may be rotated at a second variable rate of rotation. And in least one such embodiment, the first variable rate of rotation may be correlated to the second variable rate of rotation. And in at least one such other embodiment, the first variable rate of rotation may be equal to the second variable rate of rotation.

At step 208 to step 212, the aerial vehicle vertically ascends at various linear speeds. As shown in FIG. 2, at step 208 the aerial vehicle 100 vertically ascends at a linear speed V22, at step 210 the aerial vehicle 100 vertically ascends at a linear speed V23, and at step 212 the aerial vehicle 100 vertically ascends at a linear speed V24.

The linear speed V21, the linear speed V22, the linear speed V23, and the linear speed V24 could take various different forms in various different embodiments. In some embodiments, the linear speed V24 may be greater than the linear speed V23. Moreover, in some embodiments, the linear speed V23 may be greater than the linear speed V22. Furthermore, in some embodiments, the linear speed V22 may be greater than the linear speed V21. And other arrangements and/or types of arrangements of the linear speed V21, the linear speed V22, the linear speed V23, and the linear speed V24 are possible as well.

Moreover, at step 208 to step 212, the aerial vehicle 100 spins around the centerline 104 at various rotational speeds. As shown in FIG. 2, at step 208 the aerial vehicle 100 spins around the center line 104 with a rotational speed W22, at step 210 the aerial vehicle 100 spins around the center line 104 with a rotational speed W23, and at step 212 the aerial vehicle 100 spins around the center line 104 with a rotational speed W24.

The rotational speed W21, the rotational speed W22, the rotational speed W23, and the rotational speed W24 could take various different forms in various different embodiments. In some embodiments, the rotational speed W24 may be less than the rotational speed W23. Moreover, in some embodiments, the rotational speed W23 may be less than the rotational speed W22. Furthermore, in some embodiments, the rotational speed W22 may be less than the rotational speed W21. And other arrangements and/or types of arrangements of the rotational speed W21, the rotational speed W22, the rotational speed W23, and the rotational speed W24 are possible as well.

Furthermore, at step 208 to step 212, the first propulsion unit 124, the second propulsion unit 128, the first wing 116, and the second wing 120 are each positioned are various angles to the body 102. At step 208 the first propulsion unit 124 is positioned at an angle $\theta 212$ to the body 102, the second propulsion unit 128 is positioned at an angle $\theta 222$ to the body 102, the first wing 116 is positioned at an angle $\theta 232$ to the body 102, and the second wing 120 is positioned at an angle $\theta 242$ to the body 102; at step 210 the first propulsion unit 124 is positioned at an angle $\theta 213$ to the body 102, the second propulsion unit 128 is positioned at an angle $\theta 223$ to the body 102, the first wing 116 is positioned at an angle $\theta 233$ to the body 102, and the second wing 120 is positioned at an angle $\theta 243$ to the body 102; and at step 212 the first propulsion unit 124 is positioned at an angle $\theta 214$ to the body 102, the second propulsion unit 128 is positioned at an angle $\theta 224$ to the body 102, the first wing 116 is positioned at an angle $\theta 234$ to the body 102, and the second wing 120 is positioned at an angle $\theta 244$ to the body 102.

The angle $\theta 211$, the angle $\theta 212$, the angle $\theta 213$, the angle $\theta 214$, the angle $\theta 221$, the angle $\theta 222$, the angle $\theta 223$, the angle $\theta 224$, the angle $\theta 231$, the angle $\theta 232$, the angle $\theta 233$, the angle $\theta 234$, the angle $\theta 241$, the angle $\theta 242$, the angle $\theta 243$, and the angle $\theta 244$ could take various forms in various different embodiments. Generally, the angles at step 212 may be less than their respective angles at step 210, the angles in step 210 may be less than their respective angles at step 208, the angles in step 208 may be less than their respective angles at step 206. And other arrangements and/or types of arrangements of the angle $\theta 211$, the angle $\theta 212$, the angle $\theta 213$, the angle $\theta 214$, the angle $\theta 221$, the angle $\theta 222$, the angle $\theta 223$, the angle $\theta 224$, the angle $\theta 231$, the angle $\theta 232$, the angle $\theta 233$, the angle $\theta 234$, the angle $\theta 241$, the angle $\theta 242$, the angle $\theta 243$, and the angle $\theta 244$ are possible as well.

Example 200 continues at step 214 with the aerial vehicle 100 in vertical flight. As shown in FIG. 2, at step 214 the first wing 116 and the second wing 120 are positioned similarly with respect to the body 102, and the first propulsion unit 124 and the second propulsion unit 128 are positioned similarly with respect to the body 102. In some embodiments, the first propulsion unit 124 may be oriented at a first angle to the body 102 and the second propulsion unit 128 may be oriented at a second angle to the body 102, and the first angle and the second angle may be substantially parallel. And, in some embodiments, the first wing 116 may be oriented at a third angle to the body 102 and the second wing 120 may be oriented at a fourth angle to the body 102, and the third angle may be substantially parallel to the fourth angle. The term "substantially parallel," as used in this disclosure, refers to exactly parallel and/or one or more deviations from exactly parallel that do not significantly impact vertical takeoff and/or landing as described herein. Moreover, at step 214, the thrust of the first propulsion unit 124 and the second propulsion unit 128 is substantially vertical. The term "substantially vertical," as used in this disclosure, refers to exactly vertical and/or one or more deviations from exactly vertical that do not significantly impact functions described herein.

Example 200 continues at step 216 with the aerial vehicle 100 transitioning from vertical flight to horizontal flight. As shown in FIG. 2, at step 216 the aerial vehicle 100 transitions from vertical flight to horizontal flight via a flight maneuver. In some embodiments, the flight maneuver may be an Immelmann maneuver (e.g., roll over the top). And other flight maneuvers and/or types of flight maneuvers are possible as well.

In some embodiments, the first propulsion unit 124 and the second propulsion unit 128 may provide substantially the same thrust during the transitioning as during vertical flight. Moreover, in some embodiments, the first wing 116 and the second wing 120 might not be rotated during the transitioning. The term "substantially the same thrust," as used in this disclosure, refers to exactly the same thrust and/or one or more deviations from exactly the same thrust that do not significantly impact vertical takeoff and/or landing as described herein.

Example 200 continues at step 218 with the aerial vehicle 100 in horizontal flight. As shown in FIG. 2, like when the aerial vehicle 100 is in vertical flight in step 214, at step 218 the first wing 116 and the second wing 120 are positioned similarly with respect to the body 102, and the first propulsion unit 124 and the second propulsion unit 128 are positioned similarly with respect to the body 102. In some embodiments, the first propulsion unit 124 may be oriented at a first angle to the body 102 and the second propulsion unit 128 may be oriented at a second angle to the body 102, and the first angle and the third angle may be substantially parallel. And, in some embodiments, the first wing 116 may be oriented at a third angle to the body 102 and the second wing 120 may be oriented at a fourth angle to the body 102, and the third angle may be substantially parallel to the fourth angle. Moreover, at step 218 the thrust of the first propulsion pod 124 and the second propulsion pod 128 is substantially horizontal. The term "substantially horizontal," as used in this disclosure, refers to exactly horizontal and/or one or more deviations from exactly horizontal that do not significantly impact vertical takeoff and/or landing as described herein.

C. Vertical Landing

Figure 3:
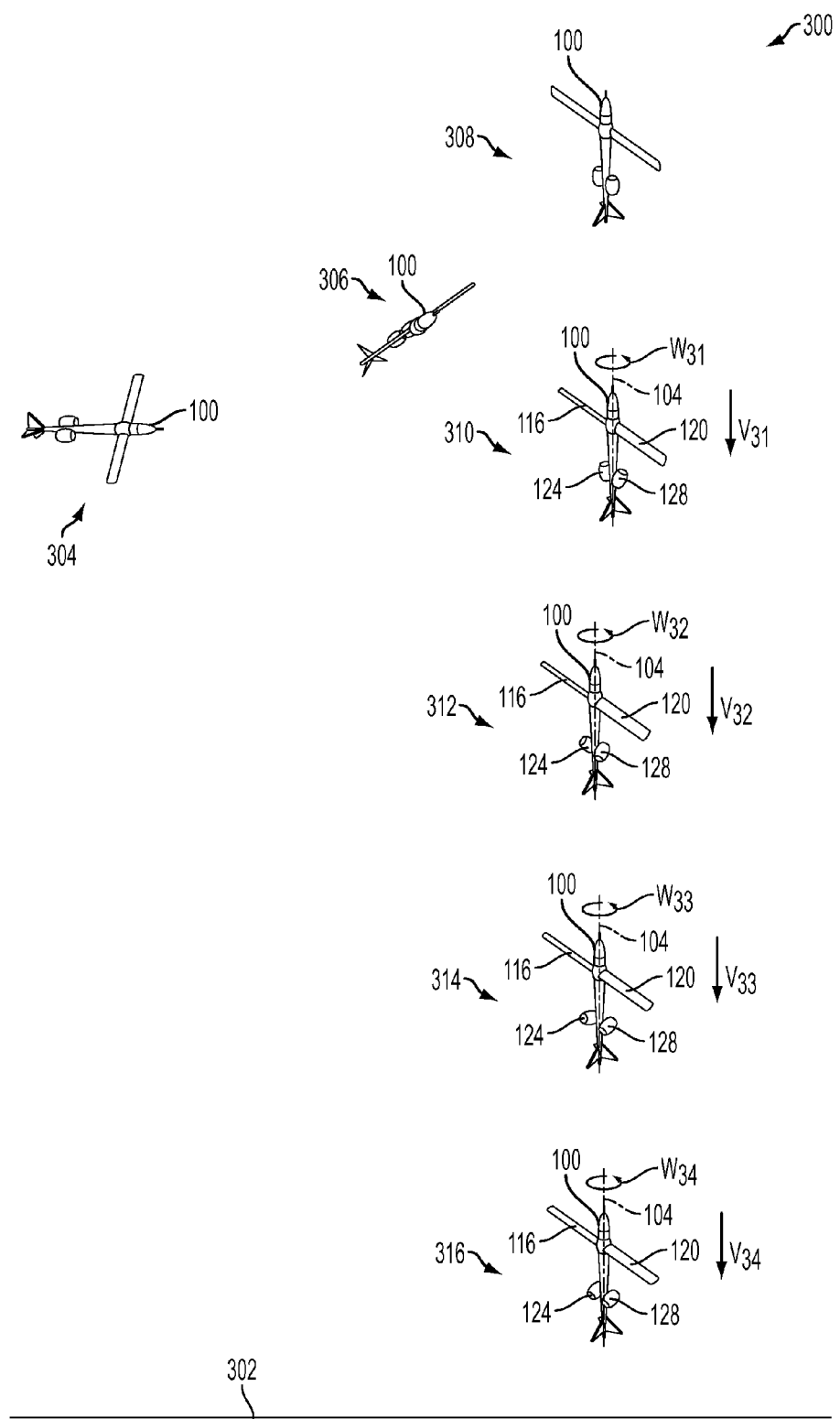
FIG. 3 depicts an example of an aerial vehicle vertically landing, according to an example embodiment.

FIG. 3 depicts an example 300 of an aerial vehicle vertically landing, according to an example embodiment. Example 300 is generally described by way of example as being carried out by the aerial vehicle 100 as described above in connection with FIG. 1. For illustrative purposes, example 300 is described in a series of steps as shown in FIG. 3, though example 300 could be carried out in any number of steps and/or combination of steps.

Example 300 begins at step 304 with the aerial vehicle 100 in horizontal flight over a ground 302. The ground 302 may take the form of or be similar in form to the ground 202. The step 304 may take the form of or be similar in form to the step 218.

Example 300 continues at step 306 with the aerial vehicle 100 transitioning from horizontal flight to vertical flight. As shown in FIG. 3, at step 306 the aerial vehicle 100 transitions from horizontal flight to vertical flight via a flight maneuver. In some embodiments, the flight maneuver may be a partial Immelmann turn. And other flight maneuvers and/or types of flight maneuvers are possible as well.

In some embodiments, the first propulsion unit 124 and the second propulsion unit 128 may provide substantially the same thrust during the transitioning as during horizontal flight. Moreover, in some embodiments, the first wing 116 and the second wing 1120 might not be rotated during the transitioning.

Example 300 continues at step 308 with the aerial vehicle 100 in vertical flight. The step 308 may take the form of or be similar to the step 214.

Example 300 continues at step 310 to step 316 with the aerial vehicle 100 rotating first propulsion pod 124, the second propulsion pod 128, the first wing 116, and the second wing 120, such that a horizontal component of thrust of the first propulsion unit 124 and the second propulsion unit 128 increases during the rotation. In some embodiments, the horizontal component of thrust may increase at least part of a time period during the rotation. Moreover, in other embodiments, the horizontal component of thrust may continuously increase during the rotation. Furthermore, in some embodiments, the rotating of the first propulsion unit 124, the second propulsion unit 128, the first wing 116, and the second wing 120 may be performed by the control system 132. And in some embodiments, the first wing 116 and the second wing 120 at step 310, step 312, step 314, and/or step 316 may be referred to as being in "rotor mode."

At step 310 to step 316, the aerial vehicle 100 vertically descends at various linear speeds. As shown in FIG. 3, at step 310 the aerial vehicle 100 vertically descends at a linear speed V31, at step 312 the aerial vehicle 100 vertically descends at a linear speed V32, at step 314 the aerial vehicle 100 vertically descends at a linear speed V33, and at step 316 the aerial vehicle 100 vertically descends at a linear speed V34. In some embodiments, the linear speed V34 may be substantially zero. The term "substantially zero," as used in this disclosure, refers to exactly zero and/or one or more deviations from exactly zero that do not significantly impact vertical takeoff and/or landing as described herein.

The linear speed V31, the linear speed V32, and the linear speed V33 could take various different forms in various different embodiments. In some embodiments, the linear speed V31 may be greater than the linear speed V32. Moreover, in some embodiments, the linear speed V32 may be greater than the linear speed V33. Furthermore, in some embodiments, the linear speed V33 may be greater than the linear speed V34. And other arrangements and/or types of arrangements of the linear speed V31, the linear speed V32, the linear speed V33, and the linear speed V34 are possible as well.

Moreover, at step 310 to step 316, the aerial vehicle 100 spins around the centerline 104 at various rotational speeds. As shown in FIG. 3, at step 310 the aerial vehicle 100 spins around the centerline 104 with a rotational speed W31, at step 312 the aerial vehicle 100 spins around the centerline 104 with a rotational speed W32, at step 314 the aerial vehicle 100 spins around the centerline 104 with a rotational speed W33, and at step 316 the aerial vehicle 100 spins around the centerline 104 with a rotational speed W34.

The rotational speed W31, the rotational speed W32, the rotational speed W33, and the rotational speed W34 could take various different forms in various different embodiments. In some embodiments, the rotational speed W31 may be less than the rotational speed W32. Moreover, in some embodiments, the rotational speed W32 may be less than the rotational speed W33. Furthermore, in some embodiments, the rotational speed W33 may be less than the rotational speed W34. And other arrangements and/or types of arrangements of the rotational speed W31, the rotational speed W32, the rotational speed W33, and the rotational speed W34 are possible as well.

Furthermore, at step 310 to step 316, the first propulsion unit 124, the second propulsion unit 128, the first wing 116, and the second wing 120 are each positioned are various angles to the body 102. At step 310 the first propulsion unit 124 is positioned at an angle θ311 to the body 102, the second propulsion unit 128 is positioned at an angle θ321 to the body 102, the first wing 116 is positioned at an angle θ331 to the body 102, and the second wing 120 is positioned at an angle θ341 to the body 102; at step 312 the first propulsion unit 124 is positioned at an angle θ312 to the body 102, the second propulsion unit 128 is positioned at an angle θ322 to the body 102, the first wing 116 is positioned at an angle θ332 to the body 102, and the second wing 120 is positioned at an angle θ342 to the body 102; at step 314 the first propulsion unit 124 is positioned at an angle θ313 to the body 102, the second propulsion unit 128 is positioned at an angle θ323 to the body 102, the first wing 116 is positioned at an angle θ333 to the body 102, and the second wing 120 is positioned at an angle θ343 to the body 102; and at step 316 the first propulsion unit 124 is positioned at an angle θ314 to the body 102, the second propulsion unit 128 is positioned at an angle θ324 to the body 102, the first wing 116 is positioned at an angle θ334 to the body 102, and the second wing 120 is positioned at an angle θ344 to the body 102 (angles not labeled in FIG. 3).

The angle θ311, the angle θ312, the angle θ313, the angle θ314, the angle θ321, the angle θ322, the angle θ323, the angle θ324, the angle θ331, the angle θ332, the angle θ333, the angle θ334, the angle θ341, the angle θ342 the angle θ343, and the angle θ344 could take various forms in various different embodiments. Generally, the angles at step 310 may be less than their respective angles at step 312, the angles in step 312 may be less than their respective angles at step 314, and the angles in step 314 may be less than their respective angles at step 316. And other arrangements and/or types of arrangements of the angle θ311, the angle θ312, the angle θ313, the angle θ314, the angle θ321, the angle θ322, the angle θ323, the angle θ324, the angle θ331, the angle θ332, the angle θ333, the angle θ334, the angle θ341, the angle θ342 the angle θ343, and the angle θ344 are possible as well.

At step 316, the thrust of the first propulsion pod 124 and the second propulsion pod 128 is substantially horizontal. Moreover, the angle θ314, the angle θ324, the angle θ334, and the angle θ344 could take various different forms in various different embodiments. In some embodiments, the angle θ314 and the angle θ324 may be substantially opposite. And in at least one such embodiment, the angle θ314 and the angle θ324 may each be substantially ninety degrees from the respective angles of the first propulsion unit 124 and the second propulsion unit 128 to the body 102 during horizontal flight and/or vertical flight. And other arrangements and/or types of arrangement for the angle θ314 and the angle θ324 are possible as well.

In some embodiments, the angle θ334 and the angle θ344 may be substantially opposite. And in at least one such embodiment, the angle θ334 and the angle θ344 may each be substantially ninety degrees from the respective angles of the first wing 116 and the second wing 120 to the body 102 during horizontal flight and/or vertical flight. And other arrangements and/or types of arrangements for the angle θ334 and the angle θ344 are possible as well.

After step 316, the aerial vehicle 100 may vertically land on the ground 302, such as via a soft touch down. Alternatively, the aerial vehicle 100 may continue to hover over the ground 302.

D. Aerial Vehicle with Tip Thrusters

Figure 4:
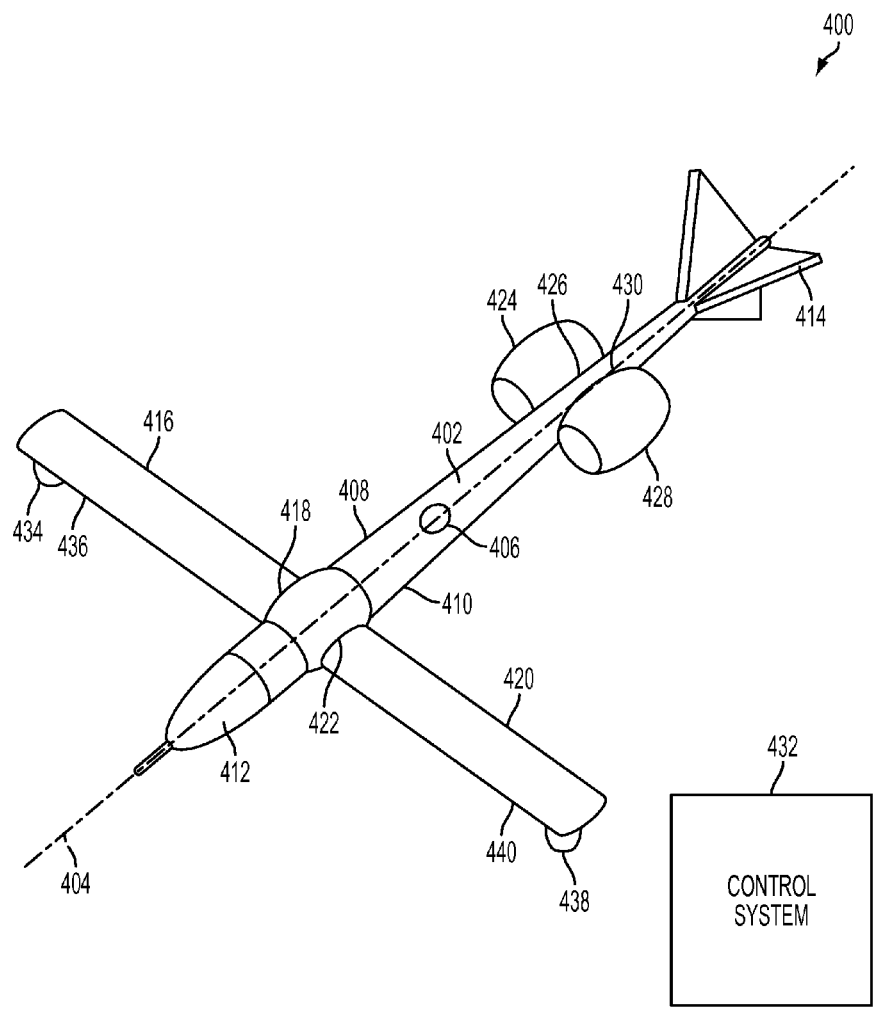
FIG. 4 depicts another aerial vehicle, according to an example embodiment.

FIG. 4 depicts an aerial vehicle 400, according to an example embodiment. In particular, the aerial vehicle 400 includes a first tip thruster 434 located substantially near an edge 436 of a first wing 416 and a second tip thruster 438 located substantially near an edge 440 of a second wing 420. The first tip thruster 434 and the second tip 436 may be operated to assist in vertically landing the aerial vehicle 400. The term "substantially near," as used in this disclosure, refers to exactly near and/or one or more deviations from exactly near that do not significantly impact vertical takeoff and/or landing as described herein.

More specifically, the aerial vehicle 400 includes a body 402, a centerline 404, a center of mass 406, a first side 408 of the body 402, a second side 410 of the body 402, a front section 412, a rear section 414, and a control system 432. As shown in FIG. 4, the centerline 404 is located in between the first side 408 of the body 402 and the second side 410 of the body 402. And as shown in FIG. 1, the center of mass 406 is located on the centerline 404.

The body 402 may take the form of or be similar in form to the body 102, the centerline 404 may take the form of or be similar in form to the centerline 104, the center of mass 406 may take the form of or be similar in form to the center of mass 106, the first side 408 of the body 402 may take the form or be similar in form to the first side 108 of the body 102, the second side 410 of the body 402 may take the form or be similar in form to the second side 110 of the body 102, the front section 412 may take the form of or be similar in form to the front section 112, the rear section 414 may take the form of or be similar in form to the rear section 114, and the control system 432 may take the form of or be similar in form to the control system 132.

As noted, the aerial vehicle 400 also includes the first wing 416 and the second wing 420. The first wing 416 is rotatably connected to the first side 408 of the body 402 via a first rotatable connection 418, and the second wing 420 is rotatably connected to the second side 410 of the body 402 via a second rotatable connection 422. The first wing 416 may take the form of or be similar in form to the first wing 116, the second wing 420 may take the form of or be similar in form to the second wing 120, the first rotatable connection 418 may take the form of or be similar in form to the first rotatable connection 118, and the second rotatable connection 422 may take the form of or be similar in form to the second rotatable connection 122.

In a further aspect, the aerial vehicle 400 includes a first propulsion unit 424 and a second propulsion unit 428. The first propulsion unit 424 is rotatably connected to the first side 408 of the body 402 via a third rotatable connection 426 and the second propulsion unit 428 is rotatably connected to the second side 410 of the body 402 via a fourth rotatable connection 430. The first propulsion unit 424 may take the form of or be similar in form to the first propulsion unit 124, the second propulsion unit 428 may take the form of or be similar in form to the second propulsion unit 128, the third rotatable connection 426 may take the form of or be similar in form to the third rotatable connection 126, and the fourth rotatable connection 430 make take the form of or be similar in form to the fourth rotatable connection 130.

In some embodiments, the first propulsion unit 424 may be attached to the first wing 416 and the second propulsion unit 428 may be attached to the second wing 420.

As noted, the aerial vehicle 400 also includes the first tip thruster 434 and the second tip thruster 438. The first tip thruster 434 and the second tip thruster 438 may provide a thrust to the aerial vehicle 400. The first tip thruster 434 is attached to the first wing 416 and the second tip thruster 438 is attached to the second wing 420.

The first tip thruster 434 and the second tip thruster 438 could take various different forms in various different embodiments. In some embodiments, the first tip thruster 434 and the second tip thruster 438 may each be a propulsion pod, a jet, and/or a propeller. And other tip thrusters and/or types of tip thrusters are possible as well.

In some embodiments, the first tip thruster 434 and the second tip thruster 438 may be powered by a fuel, such as a hydrocarbon-based fuel. And in at least one such embodiment, the fuel may be stored in the body 102 and delivered to the first tip thruster 434 and the second tip thruster 438 via one or more fluid conduits, such as piping. In other embodiments, the first tip thruster 434 and the second tip thruster 438 may be powered by one or more batteries. And in at least on such embodiment, the one or more batteries may be located on the body 402 and connected to the first tip thruster 434 and the second tip thruster 438 via one or more electrical connections, such as one or more wires and/or wireless interfaces.

In some embodiments, the aerial vehicle 400 may be a UAV. In other embodiments, the aerial vehicle 400 may be operated by a pilot, such as a physically-present human pilot. And in at least one such embodiment, the aerial vehicle 400 could transport one or more passengers.

E. Vertical Landing with Tip Thrusters

Figure 5:
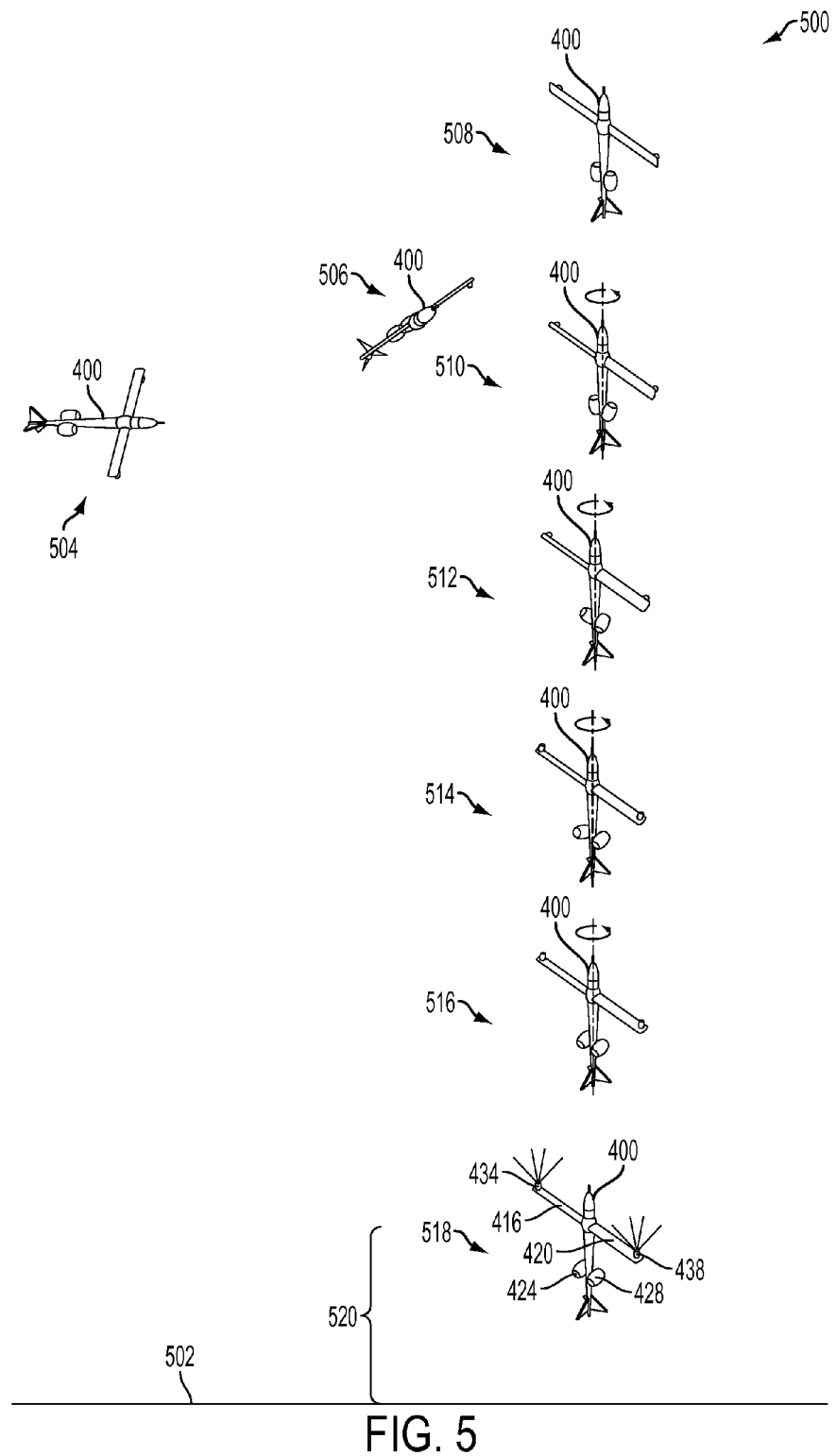
FIG. 5 depicts another example of an aerial vehicle vertically landing, according to an example embodiment.

FIG. 5 depicts another example 500 of an aerial vehicle vertically landing, according to an example embodiment. Example 500 is generally described by way of example as being carried out by the aerial vehicle 400 described above in connection with FIG. 4. For illustrative purposes, example 500 is described in a series steps as shown in FIG. 5, though example 500 could be carried in any number of steps and/or combination of steps.

Example 500 begins at step 504 with the aerial vehicle 400 in horizontal flight over a ground 502. The ground 502 may take the form of or be similar in form to the ground 202 and/or the ground 302. Moreover, the step 504 may take the form of or be similar in form to the step 218 and/or the step 304.

Example 500 continues at step 506 with the aerial vehicle 400 transitioning from horizontal flight to vertical flight. The step 506 may take the form of or be similar in form to the step 306.

Example 500 continues at step 508 with the aerial vehicle 400 in vertical flight. The step 508 may take the form of or be similar in form to the step 214 and/or the step 308.

Example 500 continues at step 510 to step 516 with the aerial vehicle 400 rotating first propulsion pod 424, the second propulsion pod 428, the first wing 416, and the second wing 420, such that a horizontal component of thrust of the first propulsion unit 424 and the second propulsion unit 428 increases during the rotation. In some embodiments, the rotating of the first propulsion unit 424, the second propulsion unit 428, the first wing 416, and the second wing 420 may be performed by the control system 432. The step 510 to the step 516 may take the form of or be similar in form to the step 310 to the step 316.

Example 500 continues at step 518 with when the aerial vehicle 400 is located a predetermined height 520 above the ground 502, operating the first tip thruster 434 and the second tip thruster 438 to assist in vertically landing the aerial vehicle 400. The first tip thruster 434 and the second tip thruster 438 may assist in vertically landing the aerial vehicle 400 by providing a thrust that is substantially oriented away from the ground 502. The term "substantially oriented," as used in this disclosure, refers to exactly oriented and/or one or more deviations from exactly oriented that do not significantly impact vertical takeoff and/or landing as described herein.

In some embodiments, when the aerial vehicle 400 is located a predetermined height 520 above the ground 502, the operating the first tip thruster 434 and the second tip thruster 438 to assist in vertically landing the aerial vehicle may be performed by the control system 432.

In a further aspect, at step 518 the aerial vehicle 400 may make a determination as to whether the aerial vehicle 400 is located the predetermined height 520 above the ground 502 and in response to the determination being that the aerial vehicle 400 is located the predetermined height 520 above the ground, operate the first tip thruster 434 and the second tip thruster 438 to assist in vertically landing the aerial vehicle 400.

In some embodiments, the control system 432 may make the determination as to whether the aerial vehicle 400 is located the predetermined height 520 above the ground 502 and in response to the determination being that the aerial vehicle 400 is located the predetermined height 520 above the ground, operate the first tip thruster 434 and the second tip thruster 438 to assist in vertically landing the aerial vehicle 400.

F. Aerial Vehicle with a Vibration Sensor Feedback System

Figure 6:
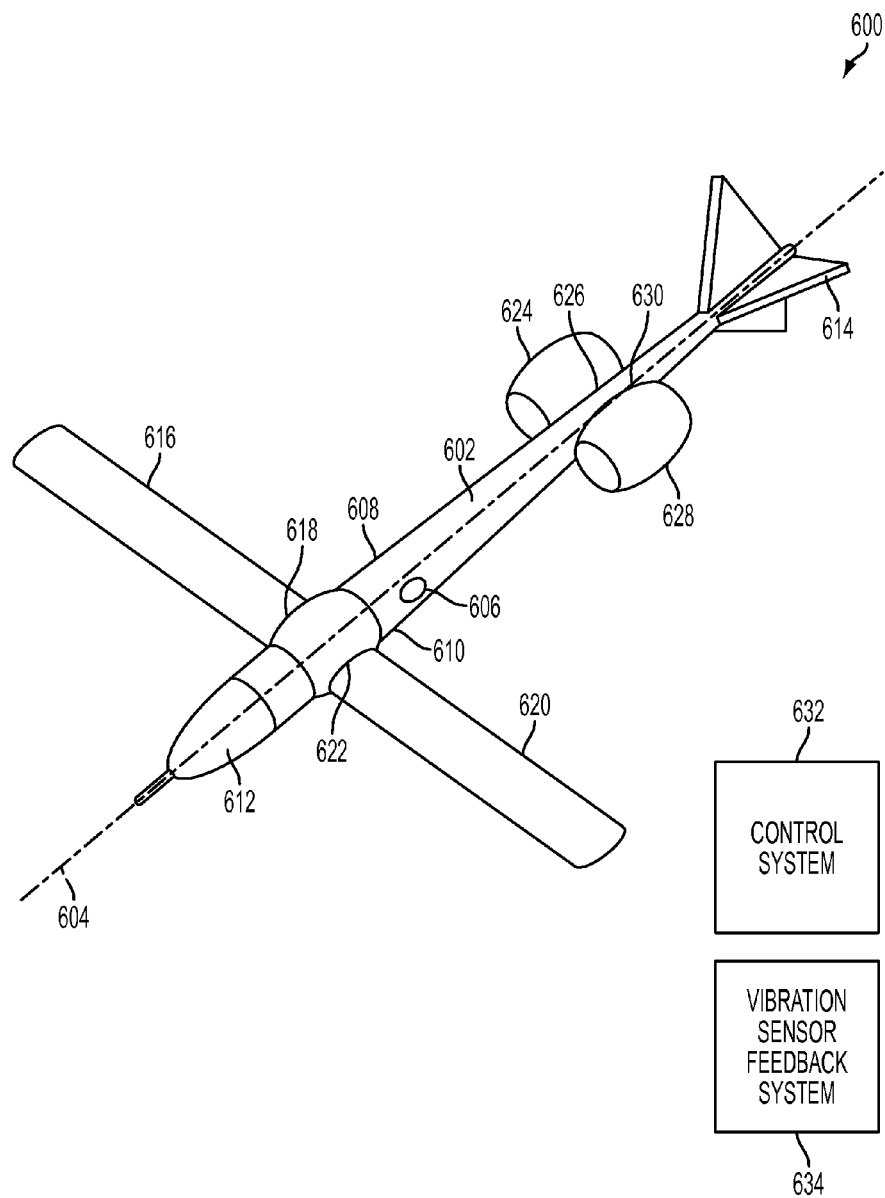
FIG. 6 depicts another aerial vehicle, according to an example embodiment.

FIG. 6 depicts an aerial vehicle 600, according to an example embodiment. In particular, the aerial vehicle 600 includes a center of mass 606, a centerline 604, a control system 632, and a vibration sensor feedback system 634. As shown in FIG. 6, the center of mass 606 is not located on the centerline 604. The control system 632 is configured to adjust the center of mass 606 during a predetermined time period. The vibration sensor feedback system 634 is configured to assist in adjusting the center of mass 606.

More specifically, the aerial vehicle 600 includes a body 602, a first side 608 of the body 602, a second side 610 of the body 602, a front section 612, and a rear section 614. The body 602 may take the form of or be similar in form to the body 102 and/or the body 402, the first side 608 of the body 602 may take the form or be similar in form to the first side 108 of the body 102 and/or the first side 408 of the body 402, the second side 610 of the body 602 may take the form or be similar in form to the second side 110 of the body 102 and/or the second side 410 of the body 402, the front section 612 may take the form of or be similar in form to the front section 112 and/or the front section 412, the rear section 614 may take the form of or be similar in form to the rear section 114 and/or the rear section 414, and the control system 632 may take the form of or be similar in form to the control system 132 and/or the control system 432.

As noted, the aerial vehicle 600 also includes the first wing 616 and the second wing 620. The first wing 616 is rotatably connected to the first side 608 of the body 602 via a first rotatable connection 618, and the second wing 620 is rotatably connected to the second side 610 of the body 602 via a second rotatable connection 622. The first wing 616 may take the form of or be similar in form to the first wing 116 and/or the first wing 416, the second wing 620 may take the form of or be similar in form to the second wing 120 and/or the second wing 420, the first rotatable connection 618 may take the form of or be similar in form to the first rotatable connection 118 and/or the first rotatable connection 418, and the second rotatable connection 622 may take the form of or be similar in form to the second rotatable connection 122 and/or the second rotatable connection 422.

In a further aspect, the aerial vehicle 600 includes a first propulsion unit 624 and a second propulsion unit 628. The first propulsion unit 624 is rotatably connected to the first side 608 of the body 602 via a third rotatable connection 626 and the second propulsion unit 628 is rotatably connected to the second side 610 of the body 602 via a fourth rotatable connection 630. The first propulsion unit 624 may take the form of or be similar in form to the first propulsion unit 124 and/or the first propulsion unit 424, the second propulsion unit 628 may take the form of or be similar in form to the second propulsion unit 128 and/or the second propulsion unit 428, the third rotatable connection 626 may take the form of or be similar in form to the third rotatable connection 126 and/or the third rotatable connection 426, and the fourth rotatable connection 630 make take the form of or be similar in form to the fourth rotatable connection 130 and/or the fourth rotatable connection 430.

In some embodiments, the first propulsion unit 624 may be attached to the first wing 616 and the second propulsion unit 628 may be attached to the second wing 620.

As noted, the aerial vehicle 600 also includes the control system 632. The control system 632 may take the form of or be similar in form to the control system 132 and/or the control system 432. Moreover, the control system 632 may be configured to perform one or more functions described herein.

In some embodiments, the control system may adjust the center of mass 606 during a predetermined time period, such that the center of mass 606 is located on the centerline 604. With this arrangement, a vibration of the aerial vehicle might be minimized and/or avoided during vertical takeoff and/or landing described herein. In some embodiments, the predetermined time period may be a time period before vertical take and/or landing described herein. And other predetermined time periods and/or types of predetermined time periods are possible as well.

The control system 632 may adjust the center of mass 606 during a predetermined time period in a variety of ways; for example, by pumping fuel and/or translating one or more components of the aerial vehicle 600, such one or more batteries, with a translation mechanism, such as a lead screw. And other ways of adjusting the center of mass 606 during a predetermined time period are possible as well.

As noted, the aerial vehicle 600 also includes the vibration sensor feedback system 634. In some embodiments, the vibration sensor feedback system 634 may be configured to assist in adjusting the center of mass 606 by making a determination as to whether to the aerial vehicle 600 is and/or will vibrate during vertical takeoff and/or landing described herein based on a location of the center of mass 606 relative to the centerline 604. And in at least on such embodiment, the vibration sensor feedback system 634 may make the determination as to whether the aerial vehicle 600 is and/or will vibrate during vertical takeoff and/or landing described herein based on a location of the center of mass 606 relative to the centerline 604 before the control system 632 adjusts the center of mass 606.

The vibration sensor feedback system 634 may be implemented with mechanical systems and/or with hardware, firmware, and/or software. As one example, the vibration sensor feedback system 634 may take the form of program instructions stored on a non-transitory computer readable medium and a processor that executes the instructions. The vibration sensor system 634 may be implemented in whole or in part on in the control system 632, on the aerial vehicle 600, and/or at least one entity remotely located from the aerial vehicle 600, such as a ground-station (not shown). Generally, the manner in which the vibration sensor feedback system 634 is implemented may vary, depending upon the particular application.

In some embodiments, the aerial vehicle 600 may be a UAV. In other embodiments, the aerial vehicle 600 may be operated by a pilot, such as a physically-present human pilot. And in at least one such embodiment, the aerial vehicle 600 could transport one or more passengers.

G. Aerial Vehicle with a Bearing

Figure 7:
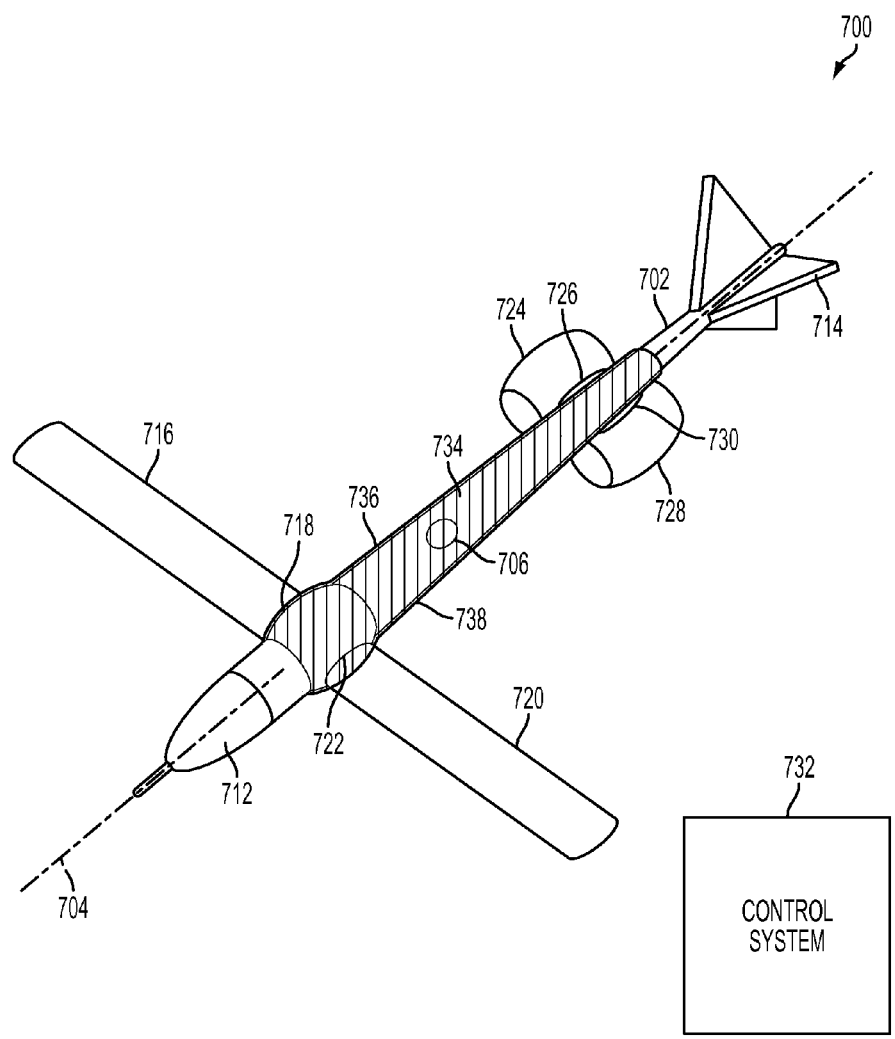
FIG. 7 depicts another aerial vehicle, according to an example embodiment.

FIG. 7 depicts an aerial vehicle 700, according to an example embodiment. In particular, the aerial vehicle 700 includes a body 702 that includes a bearing 734, a centerline 704, a first propulsion unit 724 that is rotatably connected to a first side 736 of the bearing 734 via a third rotatable connection 726, a second propulsion unit 728 that is rotatably connected to a second side 738 of the bearing 734 via a fourth rotatable connection 730, and a control system 732. The control system 732 is configured to operate the first propulsion unit 724 and the second propulsion unit 728 to cause the bearing 734 to spin around the centerline 704. Beneficially, the body 702 might not spin around the centerline 704 during vertical takeoff and/or landing as described herein.

As noted, the aerial vehicle 700 includes the body 702, the centerline 704, the first propulsion unit 724, the third rotatable connection 726, the second propulsion unit 728, the fourth rotatable connection 730, and the control system 732. As shown in FIG. 7, the centerline 704 is located between the first side 736 of the bearing 734 and the second side 738 of the bearing 734.

The body 702 may take the form of or be similar in form to the body 102, the body 402, and/or the body 602; the centerline 704 may take the form of or be similar in form to the centerline 104, the centerline 404, and/or the centerline 604; the first propulsion unit 724 may take the form of or be similar in form to the first propulsion unit 124, the first propulsion unit 424, and/or the first propulsion unit 624; the third rotatable connection 726 may take the form of or be similar in form to the third rotatable connection 126, the third rotatable connection 426, and/or the third rotatable connection 626; the second propulsion unit 728 may take the form of or be similar in form to the second propulsion unit 128, the second propulsion unit 428, and/or the second propulsion unit 628; the fourth rotatable connection 730 make take the form of or be similar in form to the fourth rotatable connection 130, the fourth rotatable connection 430, and/or the fourth rotatable connection 630; and the control system 732 may take the form of or be similar in form to the control system 132, the control system 432, and/or the control system 632.

In a further aspect, the aerial vehicle 700 includes a center of mass 706, a front section 712, a rear section 714, a first wing 716, and a second wing 720. As shown in FIG. 7, the center of mass 706 is located on the centerline 104. The first wing 716 is rotatably connected to the first side 736 of the bearing 734 via a first rotatable connection 718. The second wing 720 is rotatably connected to the second side 738 of the bearing 734 via a second rotatable connection 722.

In some embodiments, the first propulsion unit 724 may be attached to the first wing 716 and the second propulsion unit 728 may be attached to the second wing 720.

The center of mass 706 may take the form of or be similar in form to the center of mass 106 and/or the center of mass 406; the front section 712 may take the form of or be similar in form to the front section 112, the front section 412, and/or the front section 612; the rear section 714 may take the form of or be similar in form to the rear section 114, the rear section 414, and/or the rear section 614; the first wing 716 may take the form of or be similar in form to the first wing 116, the first wing 416, and/or the first wing 616; The first rotatable connection 718 may take the form of or be similar in form to the first rotatable connection 118, the first rotatable connection 418, and/or the first rotatable connection 618; the second wing 720 may take the form of or be similar in form to the second wing 120, the second wing 420, and/or the second wing 620; and the second rotatable connection 722 may take the form of or be similar in form to the second rotatable connection 122, the second rotatable connection 422, and/or the second rotatable connection 622.

In some embodiments, the aerial vehicle 700 may be a UAV. In other embodiments, the aerial vehicle 700 may be operated by a pilot, such as a physically-present human pilot. And in at least one such embodiment, the aerial vehicle 700 could transport one or more passengers.

H. Aerial Vehicle with Devices for Maintaining Wing Orientation

Figure 8:
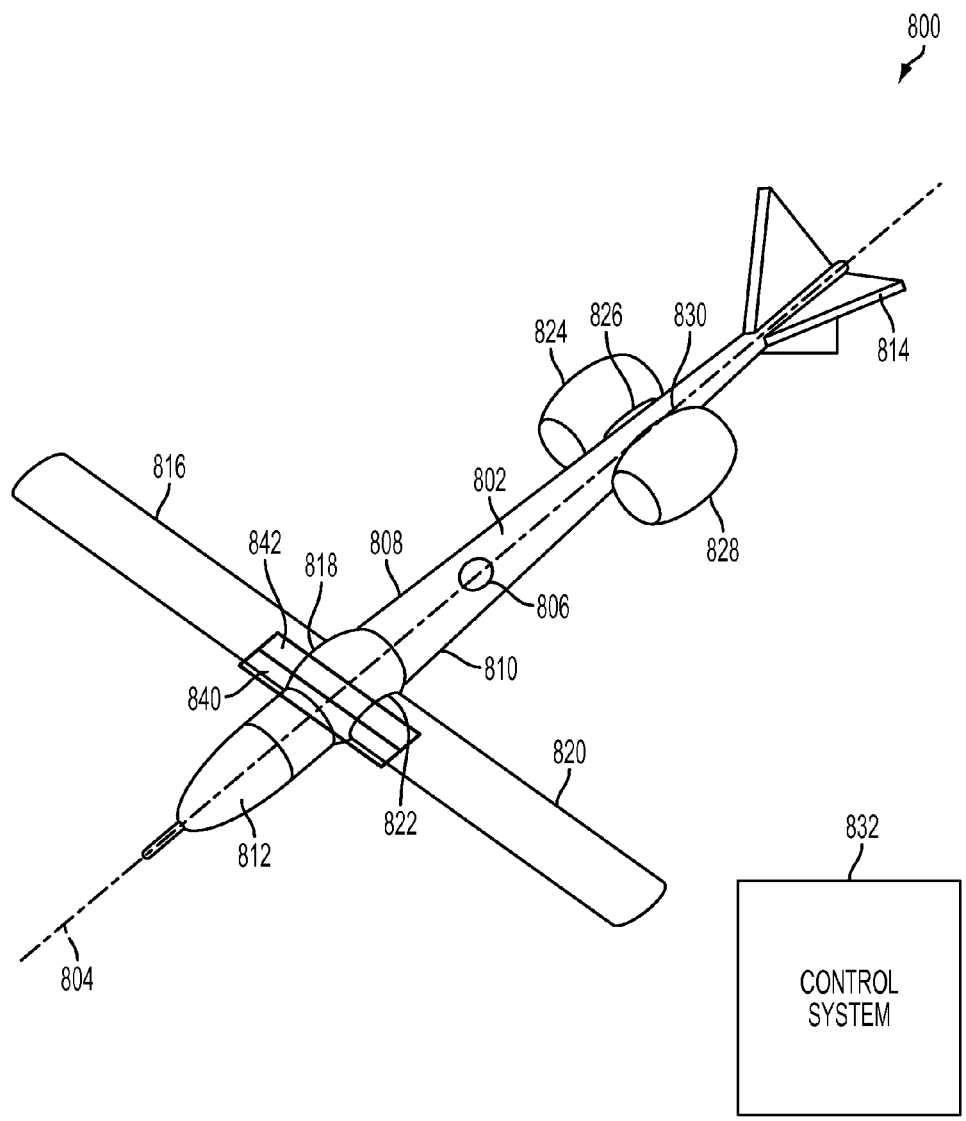
FIG. 8 depicts yet another aerial vehicle, according to an example embodiment.
Figure 9:
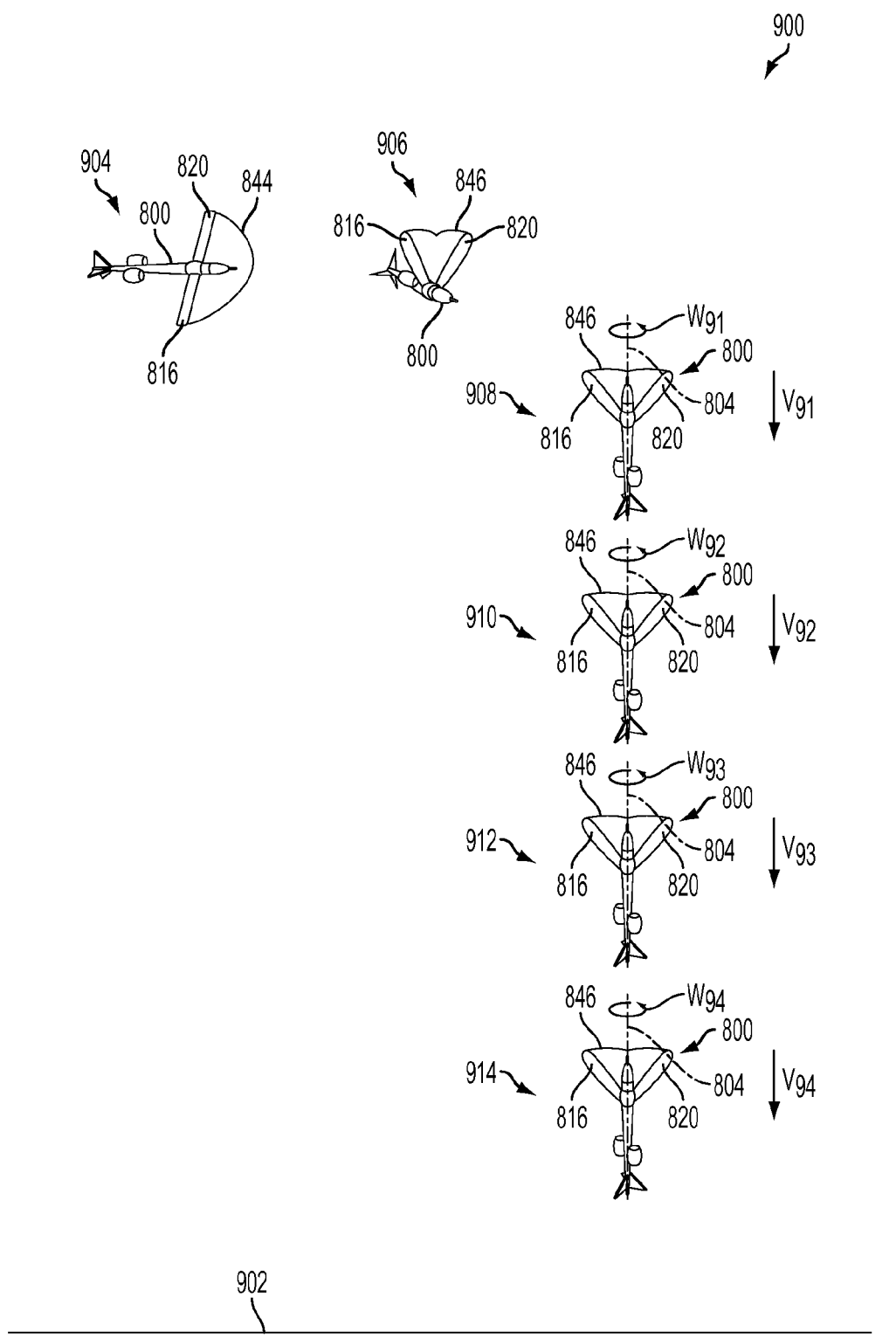
FIG. 9 depicts yet another example of an aerial vehicle vertically landing, according to an example embodiment.

FIG. 8 depicts an aerial vehicle 800, according to an example embodiment. In particular, the aerial vehicle 800 includes a first wing 816, a second wing 820, a control system 832, an electronic device 840, and a mechanical device 842. The electronic device 840 is configured to maintain the first wing 816 and the second wing 820 in a first orientation 844 (as shown in FIG. 9). The mechanical device 842 is configured to maintain the first wing 816 and the second wing 820 in a second orientation 846 when the electronic device 840 and the control system 832 fails (as shown in FIG. 9).

As noted, the aerial vehicle 800 includes the first wing 816, the second wing 820, and the control system 832. The first wing 816 is rotatably connected to a first side 808 of a body 802 via a first rotatable connection 818. The second wing 820 is rotatably connected to a second side 810 of the body 802 via a second rotatable connection 822.

The body 802 may take the form of or be similar in form to the body 102, the body 402, the body 602, and/or the body 702; the first side 808 of the body 802 may take the form or be similar in form to the first side 108 of the body 102, the first side 408 of the body 402, and/or the first side 608 of the body 602; the second side 810 of the body 802 may take the form or be similar in form to the second side 110 of the body 102, the second side 410 of the body 402, and/or the second side 610 of the body 602; the first wing 816 may take the form of or be similar in form to the first wing 116, the first wing 416, the first wing 616, and/or the first wing 716; The first rotatable connection 818 may take the form of or be similar in form to the first rotatable connection 118, the first rotatable connection 418, the first rotatable connection 618, and/or the first rotatable connection 718; the second wing 820 may take the form of or be similar in form to the second wing 120, the second wing 420, the second wing 620, and/or the second wing 720; the second rotatable connection 822 may take the form of or be similar in form to the second rotatable connection 122, the second rotatable connection 422, the second rotatable connection 622, and/or the second rotatable connection 722; and the control system 832 may take the form of or be similar in form to the control system 132, the control system 432, the control system 632, and/or the control system 732.

In a further aspect, the aerial vehicle 800 includes a centerline 804, a center of mass 806, a front section 812, a rear section 814, a first propulsion unit 824, and a second propulsion unit 828. As shown in FIG. 8, the centerline 804 is located in between the first side 808 of the body 802 and the second side 810 of the body 802. And as shown in FIG. 8, the center of mass 806 is located on the centerline 804. The first propulsion unit 824 is rotatably connected to the first side 808 of the body 802 via a third rotatable connection 826 and the second propulsion unit 828 is rotatably connected to the second side 810 of the body 802 via a fourth rotatable connection 830.

In some embodiments, the first propulsion unit 824 may be attached to the first wing 816 and the second propulsion unit 828 may be attached to the second wing 820.

The centerline 804 may take the form of or be similar in form to the centerline 104, the centerline 404, the centerline 604, and/or the centerline 704; The center of mass 806 may take the form of or be similar in form to the center of mass 106, the center of mass 406, and/or the center of mass 706; the front section 812 may take the form of or be similar in form to the front section 112, the front section 412, the front section 612, and/or the front section 712; the rear section 814 may take the form of or be similar in form to the rear section 114, the rear section 414, the rear section 614, and/or the rear section 714; the first propulsion unit 824 may take the form of or be similar in form to the first propulsion unit 124, the first propulsion unit 424, the first propulsion unit 624, and/or the first propulsion unit 724; the third rotatable connection 826 may take the form of or be similar in form to the third rotatable connection 126, the third rotatable connection 426, the third rotatable connection 626, and/or the third rotatable connection 726; the second propulsion unit 828 may take the form of or be similar in form to the second propulsion unit 128, the second propulsion unit 428, the second propulsion unit 628, and/or the second propulsion unit 728; and the fourth rotatable connection 830 make take the form of or be similar in form to the fourth rotatable connection 130, the fourth rotatable connection 430, the fourth rotatable connection 630, and/or the fourth rotatable connection 730.

As noted, the aerial vehicle 800 includes the electronic device 840 and the mechanical device 842. The electronic device 840 is located between the first wing 816 and the second wing 820. The mechanical device 842 is located between the first wing 816 and the second wing 820.

As noted, the electronic device 840 is configured to maintain the first wing 816 and the second wing 820 in the first orientation 844. In some embodiments, the aerial vehicle 800 may be configured for horizontal flight based on the first orientation 844. Moreover, in some embodiments, the electronic device 840 includes a solenoid. Furthermore, in some embodiments, the electronic device 840 may be implemented in part in the control system 832.

As noted, the mechanical device 842 is configured to maintain the first wing 816 and the second wing 820 in the second orientation 846 when the electronic device 842 and the control system 832 fails. In some embodiments, when the aerial vehicle 800 is in vertical descent, the second orientation 846 may cause the aerial vehicle 600 to spin around the centerline 804. Moreover, in some embodiments, the mechanical device 842 includes a spring.

In some embodiments, the aerial vehicle 800 may be a UAV. In other embodiments, the aerial vehicle 800 may be operated by a pilot, such as a physically-present human pilot. And in at least one such embodiment, the aerial vehicle 800 could transport one or more passengers.

I. Vertical Landing with Wings in Second Orientation

FIG. 9 depicts an example 900 of an aerial vehicle vertically landing, according to an example embodiment. Example 900 is generally described by way of example as being carried out by the aerial vehicle 800 described above in connection with FIG. 8. For illustrative purposes, example 900 is described in a series of steps as shown in FIG. 9, though example 900 could be carried out in any number of steps and/or combination of steps.

Example 900 begins at step 904 with the aerial vehicle 900 in horizontal flight over a ground 902. As shown in FIG. 9, at step 904 the first wing 816 and the second wing 820 are in the first orientation 844. The ground 902 may take the form of or be similar in form to the ground 202, the ground 302, and/or the ground 502. Moreover, the step 904 may take the form of or be similar in form to the step 218, the step 304, and/or the step 504.

Example 900 continues at step 906 with the aerial vehicle transitioning from horizontal flight to vertical descent. At step 906, the electronic device 840 and the control system 832 have failed, e.g., not functioning. Accordingly, the aerial vehicle 800 may transition from horizontal flight to vertical flight via falling. As shown in FIG. 9, at step 906 the first wing 816 and the second wing 820 are in the second orientation 846.

Example 900 continues at step 908 to step 914 with the aerial vehicle 800 in vertical descent. As shown in FIG. 9, at step 908 to step 914 the first wing 816 and the second wing 820 are in the second orientation 846.

At step 908 to step 914, the aerial vehicle 800 vertically descends at various linear speeds. As shown in FIG. 9, at step 908 the aerial vehicle 800 vertically descends at a linear speed V91, at step 910 the aerial vehicle 800 vertically descends at a linear speed V92, at step 912 the aerial vehicle 800 vertically descends at a linear speed V93, and at step 914 the aerial vehicle 800 vertically descends at a linear speed V94.

The linear speed V91, the linear speed V92, the linear speed V93, and the linear speed V94 could take various different forms in various different embodiments. In some embodiments, the linear speed V91 may be greater than the linear speed V92. Moreover, in some embodiments, the linear speed V92 may be greater than the linear speed V93. Furthermore, in some embodiments, the linear speed V93 may be greater than the linear speed V94. And other arrangements and/or types of arrangements of the linear speed V91, the linear speed V92, the linear speed V93, and the linear speed V94 are possible as well.

Moreover, at step 908 to step 914, the aerial vehicle 800 spins around the centerline 804 at various rotational speeds. As shown in FIG. 9, at step 908 the aerial vehicle 800 spins around the centerline 804 with a rotational speed W91, at step 910 the aerial vehicle 800 spins around the centerline 804 with a rotational speed W92, at step 912 the aerial vehicle 800 spins around the centerline 804 with a rotational speed W93, and at step 914 the aerial vehicle 800 spins around the centerline 804 with a rotational speed W94.

The rotational speed W91, the rotational speed W92, the rotational speed W93, and the rotational speed W94 could take various different forms in various different embodiments. In some embodiments, the rotational speed W91 may be less than the rotational speed W92. Moreover, in some embodiments, the rotational speed W92 may be less than the rotational speed W93. Furthermore, in some embodiments, the rotational speed W93 may be less than the rotational speed W94. And other arrangements and/or types of arrangements of the rotational speed W91, the rotational speed W92, the rotational speed W93, and the rotational speed W94 are possible as well.

After step 914, the aerial vehicle 800 may vertically land on the ground 902, such as via a touch down.

III. Illustrative Components of a UAV

Figure 10:
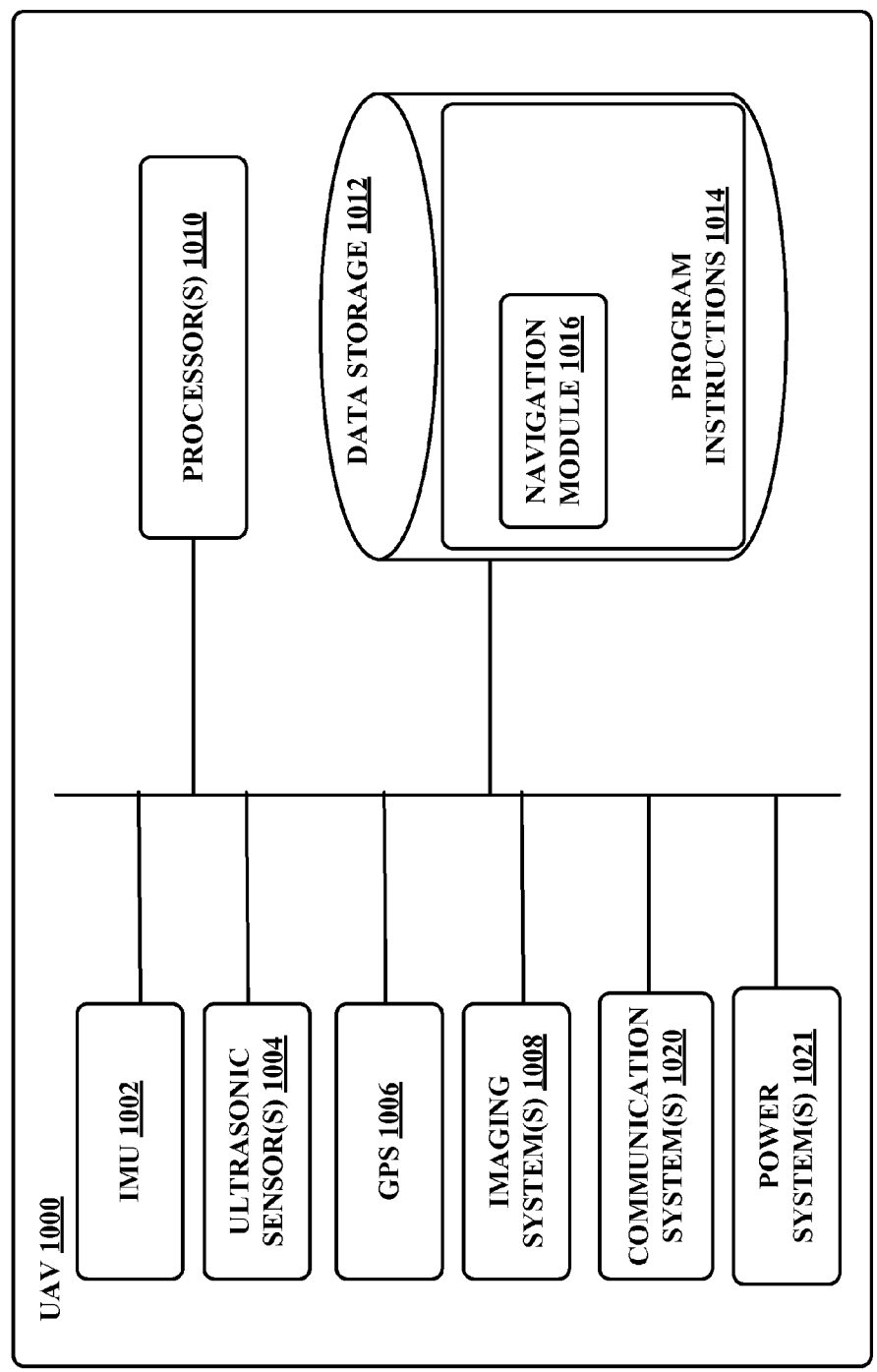
FIG. 10 is a simplified block diagram illustrating components of an unmanned aerial vehicle, according to an example embodiment.

FIG. 10 is a simplified block diagram illustrating components of a UAV 1000, according to an example embodiment. UAV 1000 may take the form of or be similar in form to one of the aerial vehicles 100, 400, 600, 700, and 800 shown in FIGS. 1, 4, 6, 7 and 8. However, a UAV 1000 may also take other forms.

UAV 1000 may include various types of sensors, and may include a computing system configured to provide the functionality described herein. In the illustrated embodiment, the sensors of UAV 1000 include an inertial measurement unit (IMU) 1002, ultrasonic sensor(s) 1004, global positioning system (GPS) receiver 1006, imaging system(s) 1008, among other possible sensors and sensing systems.

In the illustrated embodiment, UAV 1000 also includes one or more processors 1010. A processor 1010 may be a general-purpose processor or a special purpose processor (e.g., digital signal processors, application specific integrated circuits, etc.). The one or more processors 1010 can be configured to execute computer-readable program instructions 1014 that are stored in a data storage 1012 and are executable to provide at least part of the functionality of a UAV described herein.

The data storage 1012 may include or take the form of one or more computer-readable storage media that may be read or accessed by at least one processor 1010. The one or more computer-readable storage media can include volatile and/or non-volatile storage components, such as optical, magnetic, organic or other memory or disc storage, which may be integrated in whole or in part with at least one of the one or more processors 1010. In some embodiments, the data storage 1012 may be implemented using a single physical device (e.g., one optical, magnetic, organic or other memory or disc storage unit), while in other embodiments, the data storage 1012 can be implemented using two or more physical devices.

As noted, the data storage 1012 may include computer-readable program instructions 1014 and perhaps additional data, such as diagnostic data of the UAV 1000. As such, the data storage 1014 may include program instructions to perform or facilitate some or all of the UAV functionality described herein. For instance, in the illustrated embodiment, program instructions 1014 include a navigation module 1016.

A. Sensors

In an illustrative embodiment, the IMU 1002 may include both an accelerometer and a gyroscope, which may be used together to determine the orientation of the UAV 1000. In particular, the accelerometer can measure the orientation of the UAV 1000 with respect to earth, while the gyroscope measures the rate of rotation around an axis, such as a centerline of the UAV 1000. IMUs are commercially available in low-cost, low-power packages. For instance, the IMU 1002 may take the form of or include a miniaturized MicroElectroMechanical System (MEMS) or a NanoElectroMechanical System (NEMS). Other types of IMUs may also be utilized.

The IMU 1002 may include other sensors, in addition to accelerometers and gyroscopes, which may help to better determine position and/or help to increase autonomy of the UAV 1000. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 1000, slight errors in measurement may compound over time and result in a more significant error. However, an example UAV 1000 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The UAV 1000 may also include a pressure sensor or barometer, which can be used to determine the altitude of the UAV 1000. Alternatively, other sensors, such as sonic altimeters or radar altimeters, can be used to provide an indication of altitude, which may help to improve the accuracy of and/or prevent drift of the IMU.

In a further aspect, the UAV 1000 may include one or more sensors that allow the UAV 1000 to sense objects in the environment. For instance, in the illustrated embodiment, UAV 1000 includes the ultrasonic sensor(s) 1004. The ultrasonic sensor(s) 1004 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

The UAV 1000 also includes a GPS receiver 1006. The GPS receiver 1006 may be configured to provide data that is typical of well-known GPS systems, such as the GPS coordinates of the UAV 1000. Such GPS data may be utilized by the UAV 1000 for various functions.

The UAV 1000 may also include one or more imaging system(s) 1008. For example, one or more still and/or video cameras may be utilized by the UAV 1000 to capture image data from the UAV's environment. As a specific example, charge-coupled device (CCD) cameras or complementary metal-oxide-semiconductor (CMOS) cameras can be used with unmanned vehicles. Such imaging sensor(s) 1008 have numerous possible applications, such as obstacle avoidance, localization techniques, ground tracking for more accurate navigation (e.g., by applying optical flow techniques to images), video feedback, and/or image recognition and processing, among other possibilities.

In a further aspect, the UAV 1000 may use its one or more imaging system 1008 to help in determining location. For example, UAV 1000 may capture imagery of its environment and compare it to what it expects to see in its environment given current estimated position (e.g., its current GPS coordinates), and refine its estimate of its position based on this comparison.

In a further aspect, UAV 1000 may include one or more microphones. Such microphones may be configured to capture sound from the UAVs environment.

B. Navigation and Location Determination

The navigation module 1016 may provide functionality that allows the UAV 1000 to, e.g., move about in its environment and reach a desired location. To do so, the navigation module 1016 may control the altitude and/or direction of flight by controlling the mechanical features of the UAV 1000 that affect flight (e.g., wings and propulsion units).

In order to navigate the UAV 1000 to a target location, the navigation module 1016 may implement various navigation techniques, such as map-based navigation and localization-based navigation, for instance. With map-based navigation, the UAV 1000 may be provided with a map of its environment, which may then be used to navigate to a particular location on the map. With localization-based navigation, the UAV 1000 may be capable of navigating in an unknown environment using localization. Localization-based navigation may involve the UAV 1000 building its own map of its environment and calculating its position within the map and/or the position of objects in the environment. For example, as the UAV 1000 moves throughout its environment, the UAV

1000 may continuously use localization to update its map of the environment. This continuous mapping process may be referred to as simultaneous localization and mapping (SLAM). Other navigation techniques may also be utilized.

In some embodiments, the navigation module 1016 may navigate using a technique that relies on waypoints. In particular, waypoints are sets of coordinates that identify points in physical space. For instance, an air-navigation waypoint may be defined by a certain latitude, longitude, and altitude. Accordingly, the navigation module 1016 may cause the UAV 1000 to move from waypoint to waypoint, in order to ultimately travel to a final destination (e.g., a final waypoint in a sequence of waypoints).

In a further aspect, the navigation module 1016 and/or other components and systems of the UAV 1000 may be configured for "localization" to more precisely navigate. To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, the UAV 1000 may navigate to a general area using waypoints that are pre-determined based on GPS coordinates provided by a remote device at an environment within the general area. The UAV may then switch to a mode in which it utilizes a localization process to locate and travel to a specific location within the environment. In some situations, a GPS signal may only get a UAV so far, e.g., to the environment. A more precise location-determination technique may then be used to find the specific location within the environment.

Various types of location-determination techniques may be used to accomplish localization once the UAV 1000 has navigated to a general area. For instance, the UAV 1000 may be equipped with one or more sensory systems, such as, for example, imaging system(s) 1008, a directional microphone array (not shown), ultrasonic sensors 1004, infrared sensors (not shown), and/or other sensors, which may provide input that the navigation module 1016 utilizes to navigate autonomously or semi-autonomously to a specific location.

As another example, once the UAV 1000 reaches the general area, the UAV 1000 may switch to a "fly-by-wire" mode where it is controlled, at least in part, by a remote operator, who can navigate the UAV 1000 to a specific location within an environment. To this end, sensory data from the UAV 1000 may be sent to the remote operator to assist them in navigating the UAV to the specific location. For example, the UAV 1000 may stream a video feed or a sequence of still images from the UAV's imaging system(s) 1008. Other examples are possible.

As yet another example, the UAV 1000 may include a module that is able to signal to a passer-by for assistance in either reaching the specific location; for example, by displaying a visual message in a graphic display, playing an audio message or tone through speakers, flashing a light, or performing a combination of such functions. Such visual or audio message might indicate that assistance is needed in delivering the UAV 1000 to the specific location, and might provide information to assist the passer-by in delivering the UAV 1000 to the specific location, such as a description of the specific location, among other possibilities. This implementation can be useful in a scenario in which the UAV is unable to use sensory functions or another location-determination technique to determine the specific location.

As an additional example, once the UAV 1000 arrives at the general area, the UAV 1000 may utilize a beacon from a remote device to navigate. Such a beacon may take various forms. As an example, consider the scenario where a remote device, such as a mobile phone, is able to send out directional signals (e.g., an RF signal, a light signal, and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV 1000 can listen for that frequency and navigate accordingly. As a related example, if the UAV 1000 is listening for spoken commands, then the UAV 1000 could utilize spoken statements to source the specific location.

In an alternative arrangement, a navigation module may be implemented at a remote computing device, which communicates wirelessly with the UAV 1000. The remote computing device may receive data indicating the operational state of the UAV 1000, sensor data from the UAV 1000 that allows it to assess the environmental conditions being experienced by the UAV 1000, and/or location information for the UAV 1000. Provided with such information, the remote computing device may determine altitudinal and/or directional adjustments that should be made by the UAV 1000 and/or may determine how the UAV 1000 should adjust its mechanical features (e.g., wings and propulsion units) in order to effectuate such movements. The remote computing system may then communicate such adjustments to the UAV 1000 so it can move in the determined manner.

C. Communication Systems

In a further aspect, the UAV 1000 includes one or more communication systems 1020. The communications systems 1020 may include one or more wireless interfaces and/or one or more wireline interfaces, which allow the UAV 1000 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, the UAV 1000 may include communication systems 1020 that allow for both short-range communication and long-range communication. For example, the UAV 1000 may be configured for short-range communications using Bluetooth and for long-range communications under a CDMA protocol. In such an embodiment, the UAV 1000 may be configured to function as a "hot spot"; or in other words, as a gateway or proxy between a remote support device and one or more data networks, such as cellular network and/or the Internet. Configured as such, the UAV 1000 may facilitate data communications that the remote support device would otherwise be unable to perform by itself.

For example, the UAV 1000 may provide a WiFi connection to a remote device, and serve as a proxy or gateway to a cellular service provider's data network, which the UAV 1000 might connect to under an LTE or a 3G protocol, for instance. The UAV 1000 could also serve as a proxy or gateway to a high-altitude balloon network, a satellite network, or a combination of these networks, among others, which a remote device might not be able to otherwise access.

D. Power Systems

In a further aspect, the UAV 1000 may include power system(s) 1021. The power system 1021 may include one or more batteries for providing power to the UAV 1000. In one example, the one or more batteries may be rechargeable and each battery may be recharged via a wired connection between the battery and a power supply and/or via a wireless charging system, such as an inductive charging system that applies an external time-varying magnetic field to an internal battery.

IV. Illustrative Methods

A. Vertical Takeoff

Figure 11:
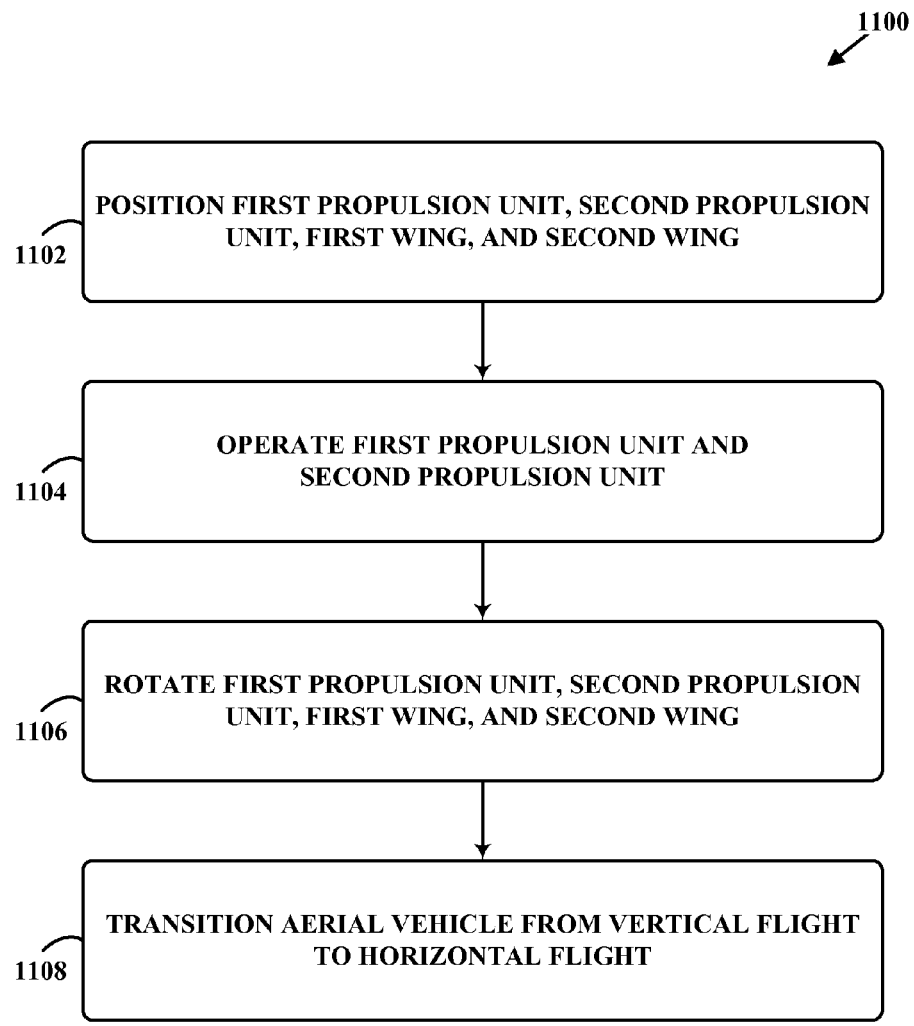
FIG. 11 is a flowchart of a method for vertical takeoff, according to an example embodiment.

FIG. 11 is a flow chart illustrating a method 1100 for vertical takeoff, according to an example embodiment. Illustrative methods, such as method 1100, may be carried out in whole or in part by a component or components of an aerial vehicle, such as by the one or more of the components of the aerial vehicle 100 shown in FIG. 1, the aerial vehicle 400 shown in FIG. 4, the aerial vehicle 600 shown in FIG. 6, the aerial vehicle 700 shown in FIG. 7, and the aerial vehicle 800 shown in FIG. 8. For simplicity, method 1100 may be described generally as being carried out by an aerial vehicle, such as the aerial vehicle 100. However, it should be understood that example methods, such as method 1100, may be carried out by other entities or combinations of entities without departing from the scope of this disclosure.

As shown by block 1102, method 1100 involves positioning a first propulsion unit, a second propulsion unit, a first wing, and a second wing each rotatably connected to a body of an aerial vehicle, such that when the aerial vehicle is substantially perpendicular to the ground, the first propulsion unit is oriented substantially opposite to the second propulsion unit and the first wing is oriented substantially opposite to the second wing.

As shown by block 1104, method 1100 involves operating the first propulsion unit and the second propulsion unit to cause the aerial vehicle to spin around a centerline of the aerial vehicle and thereby vertically lift off the ground.

As shown by block 1106, method 1100 involves rotating the first propulsion unit, the second propulsion unit, the first wing, and the second wing, such that a vertical component of a thrust of the first propulsion unit and the second propulsion increases during the rotation, wherein, after rotating for a certain period of time, the first propulsion unit is oriented substantially parallel to the second propulsion unit, the first wing is oriented substantially parallel to the second wing, and the aerial vehicle enters vertical flight. In some embodiments, the vertical component of thrust of the first propulsion unit and the second propulsion unit may increase at least part of a time period during the rotation. Moreover, in other embodiments, the vertical component of thrust of the first propulsion unit and the second propulsion unit may continuously increase during the rotation.

In some embodiments, the first propulsion unit and the second propulsion unit may be rotated at a first variable rate of rotation and the first wing and the second wing may be rotated at a second variable rate of rotation. And in least one such embodiment, the first variable rate of rotation may be correlated to the second variable rate of rotation. And in at least one such other embodiment, the first variable rate of rotation may be equal to the second variable rate of rotation.

As shown by block 1108, the method 1100 involves transitioning the aerial vehicle from vertical flight to horizontal flight. In some embodiments, the transitioning is carried out via a flight maneuver, such as an Immelmann maneuver. Moreover, in some embodiments, the first propulsion unit and the second propulsion unit may provide substantially the same thrust during the transitioning as during vertical flight. Furthermore, in some embodiments, the first wing and the second wing may not be rotated during the transitioning.

In some embodiments, the positioning, the operating, the rotating, and/or the transitioning may be performed by a control system, such as the control system 132, the control system 432, the control system 632, the control system 732, and/or the control system 832.

In some embodiments, method 1100 may be carried out by an aerial vehicle that might not vertically land. As one example, method 1100 may be carried out by an aerial vehicle that is configured to land using a runway of an airport.

B. Vertical Landing

Figure 12:
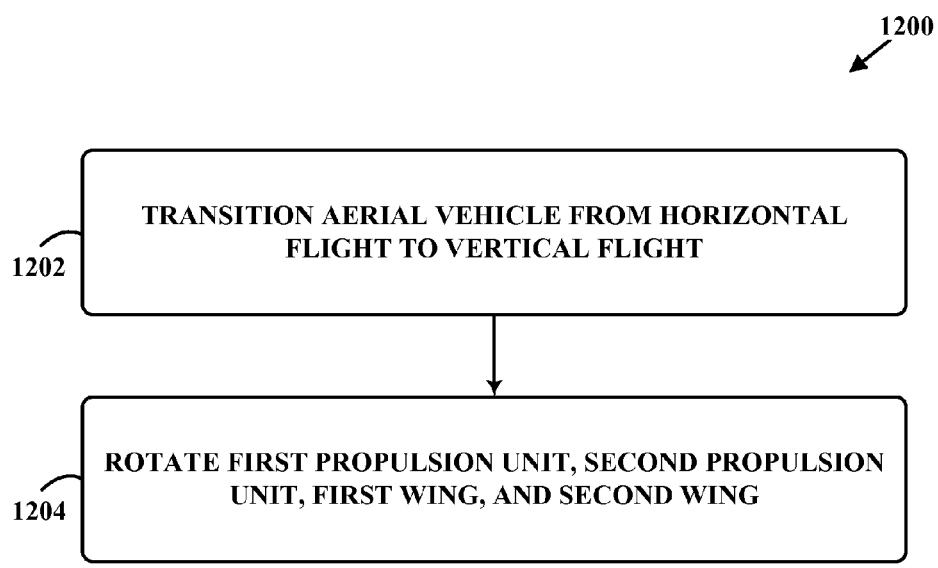
FIG. 12 is a flowchart of a method for vertical landing, according to an example embodiment.

FIG. 12 is a flow chart illustrating a method 1200 for vertical landing, according to an example embodiment. Illustrative methods, such as method 1200, may be carried out in whole or in part by a component or components of an aerial vehicle, such as by the one or more of the components of the aerial vehicle 100 shown in FIG. 1, the aerial vehicle 400 shown in FIG. 4, the aerial vehicle 600 shown in FIG. 6, the aerial vehicle 700 shown in FIG. 7, and the aerial vehicle 800 shown in FIG. 8. For simplicity, method 1200 may be described generally as being carried out by an aerial vehicle, such as the aerial vehicle 100. However, it should be understood that example methods, such as method 1200, may be carried out by other entities or combinations of entities without departing from the scope of this disclosure.

As shown by block 1202, method 1200 involves transitioning an aerial vehicle from horizontal flight to vertical flight. In some embodiments, the first propulsion unit and the second propulsion unit may provide substantially the same thrust during the transitioning as during horizontal flight. Moreover, in some embodiments, the first wing and the second wing may not be rotated during the transitioning.

As shown by block 1204, method 1200 involves rotating a first propulsion unit, a second propulsion unit, a first wing, and a second wing each rotatably connected to a body of the aerial vehicle, such that a horizontal component of a thrust of the first propulsion unit and the second propulsion unit increases during the rotation, wherein, after rotating for a certain period of time, the first propulsion unit is oriented substantially opposite to the second propulsion unit and the first wing is oriented substantially opposite to the second wing and the aerial vehicle is spinning around a centerline of the aerial vehicle.

In some embodiments, the horizontal component of thrust of the first propulsion unit and the second propulsion unit may increase at least part of a time period during the rotation. Moreover, in other embodiments, the horizontal component of thrust of the first propulsion unit and the second propulsion unit may continuously increase during the rotation.

In some embodiments, the first propulsion unit and the second propulsion unit may be rotated at a first variable rate of rotation and the first wing and the second wing may be rotated at a second variable rate of rotation. And in least one such embodiment, the first variable rate of rotation may be correlated to the second variable rate of rotation. And in at least one such other embodiment, the first variable rate of rotation may be equal to the second variable rate of rotation.

In some embodiments, the transitioning and/or the rotating may be performed by a control system, such as the control system 132, the control system 432, the control system 632, the control system 732, and/or the control system 832.

In some embodiments, method 1200 may be carried out by an aerial vehicle that might not vertically takeoff. As one example, method 1200 may be carried out by an aerial vehicle that is configured to takeoff using a runway of an airport.

Alternatively, a method for vertically landing may involve spinning during vertical descent, such as in example 900.

Figure 13:
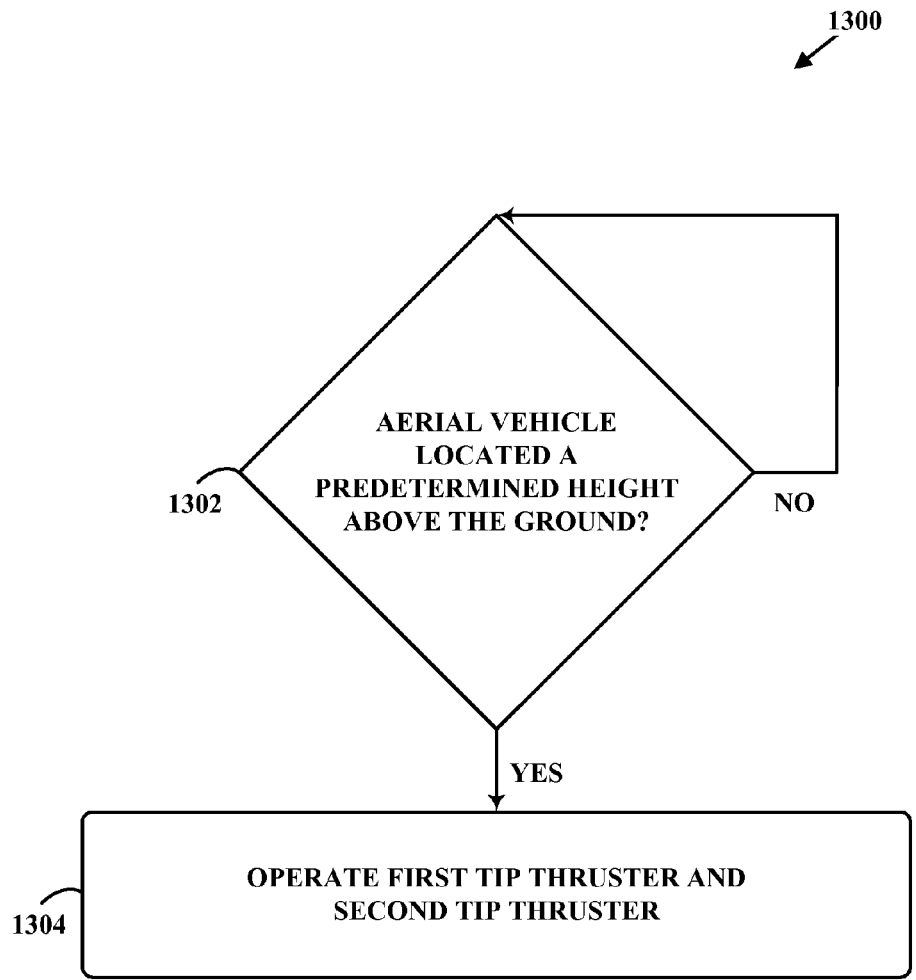
FIG. 13 is a flowchart of another method for vertical landing, according to an example embodiment.

FIG. 13 a flowchart illustrating another method 1300 for vertical landing, according to an example embodiment. Method 1300 may be performed in connection with method 1200.

As shown by block 1302, method 1300 involves making a determination as to whether the aerial vehicle is located a predetermined height above the ground.

In response to the determination being that the aerial vehicle is located a predetermined height above the ground, as shown by block 1304 method 1300 involves operating a first tip thruster located substantially near an edge of the first wing and a second tip thruster located substantially near an edge of the second wing to assist in vertically landing the aerial vehicle.

Otherwise, method 1300 continues at block 1302 with making a determination as to whether the aerial vehicle is located a predetermined height above the ground.

In some embodiments, the making a determination and/or the operating is performed by a control system, such as the control system 132, the control system 432, the control system 632, the control system 732, and/or the control system 832.

Method 1300 may further involve adjusting a center of mass of the aerial vehicle before transitioning from horizontal flight to vertical flight, such that the center of mass is located on a centerline of the aerial vehicle. In some embodiments, the adjusting may be performed by a control system, such as the control system 132, the control system 432, the control system 632, the control system 732, and/or the control system 832.

In some embodiments, method 1300 may be carried out by an aerial vehicle that might not vertically takeoff. As one example, method 1300 may be carried out by an aerial vehicle that is configured to takeoff using a runway of an airport.

C. Reaching a Desired Location

Figure 14:
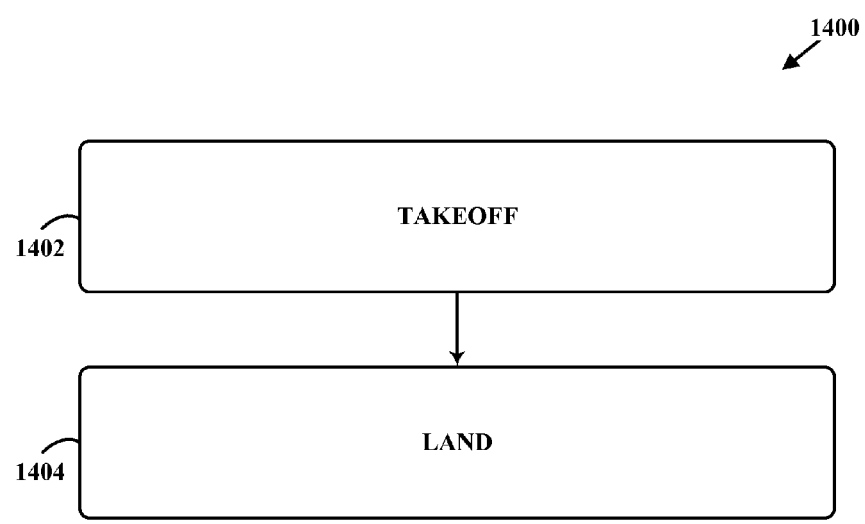
FIG. 14 is a flowchart of a method for reaching a desired location, according to an example embodiment.

FIG. 14 is a flow chart illustrating a method 1400 for reaching a desired location, according to an example embodiment. Illustrative methods, such as method 1400, may be carried out in whole or in part by a component or components of an aerial vehicle, such as by the one or more of the components of the aerial vehicle 100 shown in FIG. 1, the aerial vehicle 400 shown in FIG. 4, the aerial vehicle 600 shown in FIG. 6, the aerial vehicle 700 shown in FIG. 7, and the aerial vehicle 800 shown in FIG. 8. For simplicity, method 1400 may be described generally as being carried out by an aerial vehicle, such as the aerial vehicle 100. However, it should be understood that example methods, such as method 1400, may be carried out by other entities or combinations of entities without departing from the scope of this disclosure.

As shown by block 1402, method 1400 may involve taking off. In some embodiments, taking off may involve method 1100. Moreover, in other embodiments, taking off may involve taking off via thrust of one or more propulsion units that is substantially vertical (which may be referred to as blasting off). It may be desirable for taking off to involve taking off via thrust of one or more propulsion units that is substantially vertical in a scenario where the aerial vehicle may need to reach the desired location quickly. Furthermore, in other embodiments, taking off may involve taking off using a runway of an airport.

As shown by block 1404, method 1400 may involve landing. In some embodiments, landing may involve method 1200. And in at least one such embodiment, landing may further involve method 1300. It may be desirable for landing to involve method 1200 (and possibly method 1300) when the desired location is in an environment, such as an urban environment, where safety and/or accuracy of the landing is desirable. Moreover, in other embodiments, landing may involve spinning during vertical descent. Furthermore, in other embodiments, landing may involve landing using a runway of an airport.

V. Applications

Embodiments described herein may have a variety of applications. As one example, embodiments described herein may relate to and/or be implemented in a system in which one or more UAVs, such as the UAV 1000, are configured to provide medical support.

In an illustrative embodiment, a medical-support system may include a fleet of UAVs that are distributed throughout a geographic area, such as a city. The medical-support system may be configured for communications between remote devices, such as mobile phones, so that medical support can be requested by a person in need of such medical support (or by others on behalf of a person in need). The medical-support system can then dispatch the appropriate UAV or UAVs to the scene of the medical situation in order to provide medical support.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. An aerial vehicle comprising:
a first propulsion unit and a second propulsion unit each rotatably connected to a body, wherein the first propulsion unit is located on a first side of the body, and wherein the second propulsion unit is located on a second side of the body;
a first wing and a second wing each rotatably connected to the body, wherein the first wing is located on the first side of the body, and wherein the second wing is located on the second side of the body; and
a control system configured to:
position the first propulsion unit, the second propulsion unit, the first wing, and the second wing, such that when the aerial vehicle is substantially perpendicular to the ground, the first propulsion unit is oriented substantially opposite to the second propulsion unit with respect to a first axis that is substantially perpendicular to a centerline of the aerial vehicle and the first wing is oriented substantially opposite to the second wing with respect to a second axis that is substantially perpendicular to the centerline of the aerial vehicle;

operate the first propulsion unit and the second propulsion unit to cause the aerial vehicle to spin around the centerline of the aerial vehicle and thereby vertically lift off the ground; and rotate the first propulsion unit about the first axis, the second propulsion unit about the first axis, the first wing about the second axis, and the second wing about the second axis, such that a vertical component of a thrust of the first propulsion unit and the second propulsion unit increases during the rotation, wherein after rotating for a certain period of time, the first propulsion unit is oriented substantially parallel to the second propulsion unit with respect to the first axis, the first wing is oriented substantially parallel to the second wing with respect to the second axis, and the aerial vehicle enters vertical flight, wherein in vertical flight, the thrust of the first propulsion unit and the second propulsion unit is substantially vertical.

2. The aerial vehicle of claim 1, wherein the control system is further configured to:

position the first propulsion unit, the second propulsion unit, the first wing, and the second wing, such that when the aerial vehicle is substantially perpendicular to the ground, the first propulsion unit is oriented at a first angle to the body, the second propulsion unit is oriented at a second angle to the body, the first wing is oriented at a third angle to the body, and the second wing is oriented at a fourth angle to the body, wherein the first angle is substantially opposite the second angle, and wherein the third angle is substantially opposite the fourth angle; and rotate the first propulsion unit about the first axis, the second propulsion unit about the first axis, the first wing about the second axis, and the second wing about the second axis, such that a vertical component of a thrust of the first propulsion unit and the second propulsion unit increases during the rotation, wherein after rotating for a certain period of time, the first propulsion unit is oriented at a fifth angle to the body, the second propulsion unit is oriented at a sixth angle to the body, the first wing is oriented at a seventh angle to the body, and the second wing is oriented at an eighth angle to the body, wherein the fifth angle and the sixth angle are equal, and wherein the seventh angle and the eighth angle are equal.

3. The aerial vehicle of claim 1, wherein the control system, when the aerial vehicle is in vertical flight, is further configured to rotate the first propulsion unit about the first axis, the second propulsion unit about the first axis, the first wing about the second axis, and the second wing about the second axis, such that a horizontal component of thrust of the first propulsion unit and the second propulsion unit increases during the rotation, wherein after rotating for some a certain period of time, the first propulsion unit is oriented substantially opposite to the second propulsion unit with respect to the first axis, the first wing is oriented substantially opposite to the second wing with respect to the second axis, and the aerial vehicle is spinning around the centerline.

4. The aerial vehicle of claim 3, further comprising:

a first tip thruster located substantially near an edge of the first wing; and second tip thruster located substantially near an edge of the second wing, wherein the control system is further configured to:

make a determination as to whether the aerial vehicle is located a predetermined height above the ground; and in response to the determination being that the aerial vehicle is located a predetermined height above the ground, operate the first tip thruster and the second tip thruster to assist in vertically landing the aerial vehicle.

5. The aerial vehicle of claim 3, further comprising:

an electronic device configured to maintain the first wing and the second wing in a first orientation, wherein the aerial vehicle is configured for horizontal flight based on the first orientation; and a mechanical device configured to maintain the first wing and the second wing in a second orientation when the electronic device and the control system fails, wherein the second orientation causes the aerial vehicle to spin around the centerline.

6. The aerial vehicle of claim 5, wherein the electronic device comprises a solenoid.

7. The aerial vehicle of claim 5, wherein the mechanical device comprises a spring.

8. The aerial vehicle of claim 1, further comprising a center of mass, wherein the center of mass is located on the centerline.

9. The aerial vehicle of claim 1, further comprising:

a center of mass; and a vibration sensor feedback system, wherein the control system is further configured to adjust the center of mass during a predetermined time period, such that the center of mass is located on the centerline, and wherein the vibration sensor feedback system is configured to assist in adjusting the center of mass by making a determination that the aerial vehicle will vibrate based on a location of the center of mass relative to the centerline.

10. The aerial vehicle of claim 9, wherein the predetermined time period comprises a time period before the first propulsion unit and the second propulsion unit are operated.

11. The aerial vehicle of claim 1, wherein the control system is further configured to: rotate the first propulsion unit and the second propulsion unit at a first variable rate of rotation; and rotate the first wing and the second wing about at a second variable rate of rotation.

12. The aerial vehicle of claim 11, wherein the first variable rate of rotation is correlated to the second variable rate of rotation.

13. The aerial vehicle of claim 1, wherein the body comprises a bearing, and wherein the first propulsion unit and the second propulsion unit are each rotatably connected to the bearing, and wherein the first propulsion unit is located on a first side of the bearing, and wherein the second propulsion unit is located on a second side of the bearing, and wherein the first wing and the second wing are each rotatably connected to the bearing, and wherein the first wing is located on the first side of the bearing, and wherein the second wing is located on the second side of the bearing, and wherein the control system is further configured to:

operate the first propulsion unit and the second propulsion unit to cause the bearing to spin around the centerline and thereby vertically lift off the ground.

14. The aerial vehicle of claim 13, wherein when the aerial vehicle is in vertical flight, the control system is further configured to rotate the first propulsion unit about the first axis, the second propulsion unit about the first axis, the first wing about the second axis, and the second wing about the second axis, such that a horizontal component of thrust of the first propulsion unit and the second propulsion unit increases during the rotation, wherein after rotating for some period of time, the first propulsion unit is oriented substantially opposite to the second propulsion unit with respect to the first axis, the first wing is oriented substantially opposite to the second wing with respect to the second axis, and the bearing is spinning around the centerline.

15. A method comprising:

positioning a first propulsion unit, a second propulsion unit, a first wing, and a second wing each rotatably connected to a body of an aerial vehicle, such that when the aerial vehicle is substantially perpendicular to the ground, the first propulsion unit is oriented substantially opposite to the second propulsion unit with respect to a first axis that is substantially perpendicular to a centerline of the aerial vehicle and the first wing is oriented substantially opposite to the second wing with respect to a second axis that is substantially perpendicular to the centerline of the aerial vehicle;

operating the first propulsion unit and the second propulsion unit to cause the aerial vehicle to spin around the centerline of the aerial vehicle and thereby vertically lift off the ground;

rotating the first propulsion unit about the first axis, the second propulsion unit about the first axis, the first wing about the second axis, and the second wing about the second axis, such that a vertical component of a thrust of the first propulsion unit and the second propulsion unit increases during the rotation, wherein after rotating for a certain period of time, the first propulsion unit is oriented substantially parallel to the second propulsion unit with respect to the first axis, the first wing is oriented substantially parallel to the second wing with respect to the first axis, and the aerial vehicle enters vertical flight, wherein in vertical flight, the thrust of the first propulsion unit and the second propulsion unit is substantially vertical; and transitioning the aerial vehicle from vertical flight to horizontal flight.

16. The method of claim 15, wherein the first propulsion unit and the second propulsion unit provide substantially the same thrust during the transitioning as during vertical flight.

17. The method of claim 15, wherein the first wing and the second wing are not rotated during the transitioning.

18. A method comprising:

transitioning an aerial vehicle from horizontal flight to vertical flight, wherein the aerial vehicle comprises a first propulsion unit, a second propulsion unit, a first wing, and a second wing each rotatably connected to a body of the aerial vehicle; and rotating the first propulsion unit about a first axis that is substantially perpendicular to a centerline of the aerial vehicle, the second propulsion unit about the first axis, the first wing about a second axis that is substantially perpendicular to the centerline of the aerial vehicle, and the second wing about the second axis, such that a horizontal component of a thrust of the first propulsion unit and the second propulsion unit increases during the rotation, wherein after rotating for a certain period of time, the first propulsion unit is oriented substantially opposite to the second propulsion unit with respect to the first axis, the first wing is oriented substantially opposite to the second wing with respect to the second axis, and the aerial vehicle is spinning around the centerline of the aerial vehicle.

19. The method of claim 18, wherein the first propulsion unit and the second propulsion unit provide substantially the same thrust during the transitioning as during horizontal flight.

20. The method of claim 18, further comprising:

making a determination as to whether the aerial vehicle is located a predetermined height above the ground; and in response to the determination being that the aerial vehicle is located a predetermined height above the ground, operating a first tip thruster located substantially near an edge of the first wing and a second tip thruster located substantially near an edge of the second wing to assist in vertically landing the aerial vehicle.

* * * * *